(12) United States Patent
Karaki

(10) Patent No.: US 7,519,664 B2
(45) Date of Patent: Apr. 14, 2009

(54) PRESENTATION SUPPORTING DEVICE AND RELATED PROGRAMS

(75) Inventor: Isuke Karaki, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 973 days.

(21) Appl. No.: 11/060,755

(22) Filed: Feb. 18, 2005

(65) Prior Publication Data

US 2005/0198133 A1 Sep. 8, 2005

(30) Foreign Application Priority Data

Feb. 20, 2004 (JP) ............................. 2004-044646
Feb. 1, 2005 (JP) ............................. 2005-025126

(51) Int. Cl.
*G06F 15/16* (2006.01)
*G06F 12/00* (2006.01)
(52) U.S. Cl. .......................... 709/205; 709/203; 725/37
(58) Field of Classification Search ................ 709/205, 709/203, 217, 218, 250; 725/37
See application file for complete search history.

(56) References Cited

U.S. PATENT DOCUMENTS

| 6,308,199 | B1 * | 10/2001 | Katsurabayashi | 709/204 |
| 7,426,540 | B1 * | 9/2008 | Matsumoto et al. | 709/206 |
| 2001/0053685 | A1 * | 12/2001 | Mori et al. | 455/411 |
| 2002/0101445 | A1 * | 8/2002 | Berque | 345/751 |
| 2003/0140101 | A1 * | 7/2003 | Kunugi et al. | 709/203 |

FOREIGN PATENT DOCUMENTS

| JP | A-2003-085112 | 3/2003 |
| JP | A-2003-333559 | 11/2003 |

* cited by examiner

*Primary Examiner*—Zarni Maung
(74) *Attorney, Agent, or Firm*—Oliff & Berridge, PLC

(57) ABSTRACT

Presentation supporting device 10 for projecting image on screen is provided with the functions of acting as an access point to wireless LAN network and managing a schedule of a presentation. The participants joining a presentation meeting bring stations 20 storing image data to a presentation room to connect the stations to a wireless LAN network. When the occupation of a screen is permitted by presentation supporting device 10, image data is sent from a station 20.

18 Claims, 15 Drawing Sheets

FIG. 2
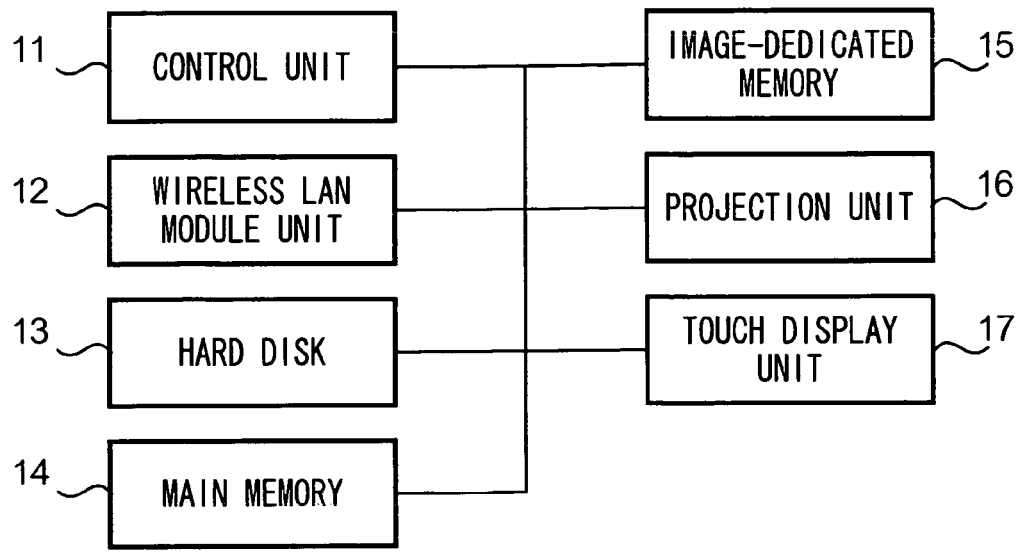
FIG. 3
| INDEX | NICKNAME | ADDRESS | ORDER |
|---|---|---|---|
| 1 | ... | ... | 1 |
| 2 | ... | ... | 2 |
| 3 | ... | ... | 3 |
| 4 | ... | ... | 4 |
FIG. 4
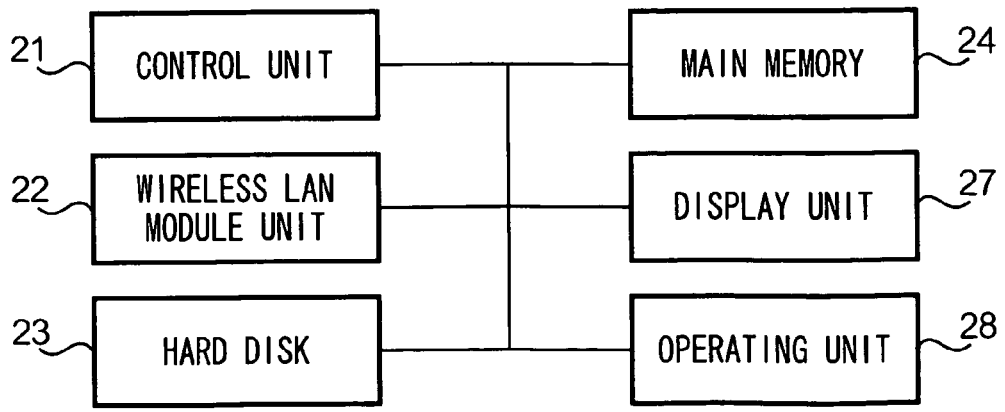

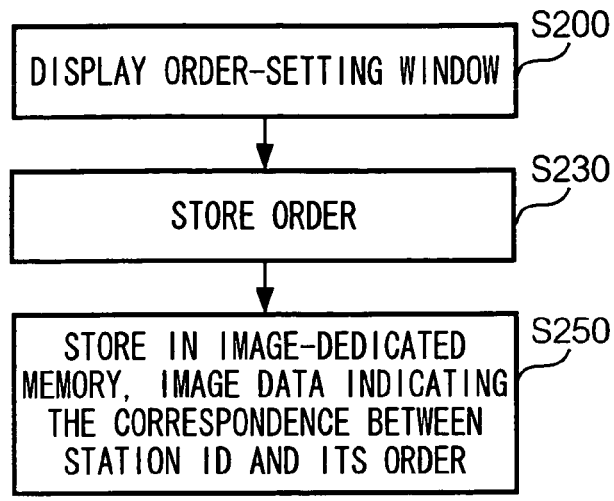
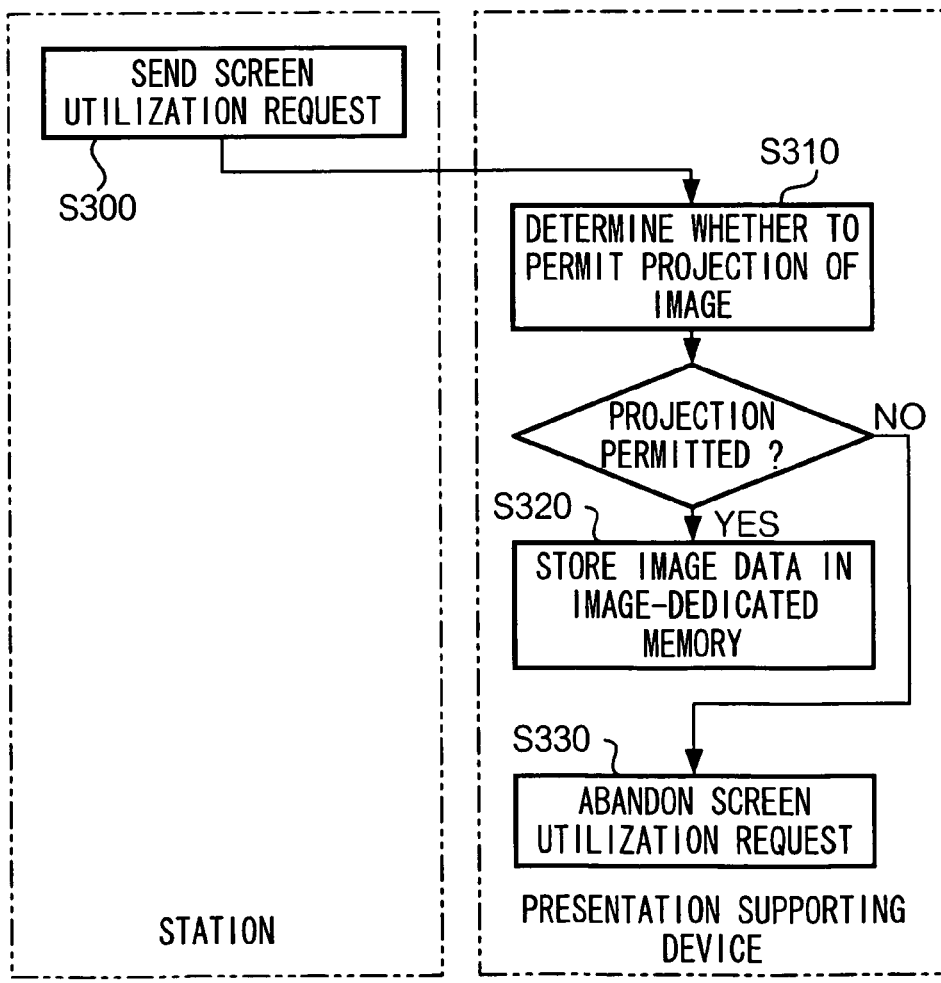

INPUT ORDER FOR HAVING PARTICIPANTS TO OCCUPY SCREEN

| STATION ID | ORDER |
|---|---|
| A A A | |
| B B B | |
| C C C | |
| D D D | |

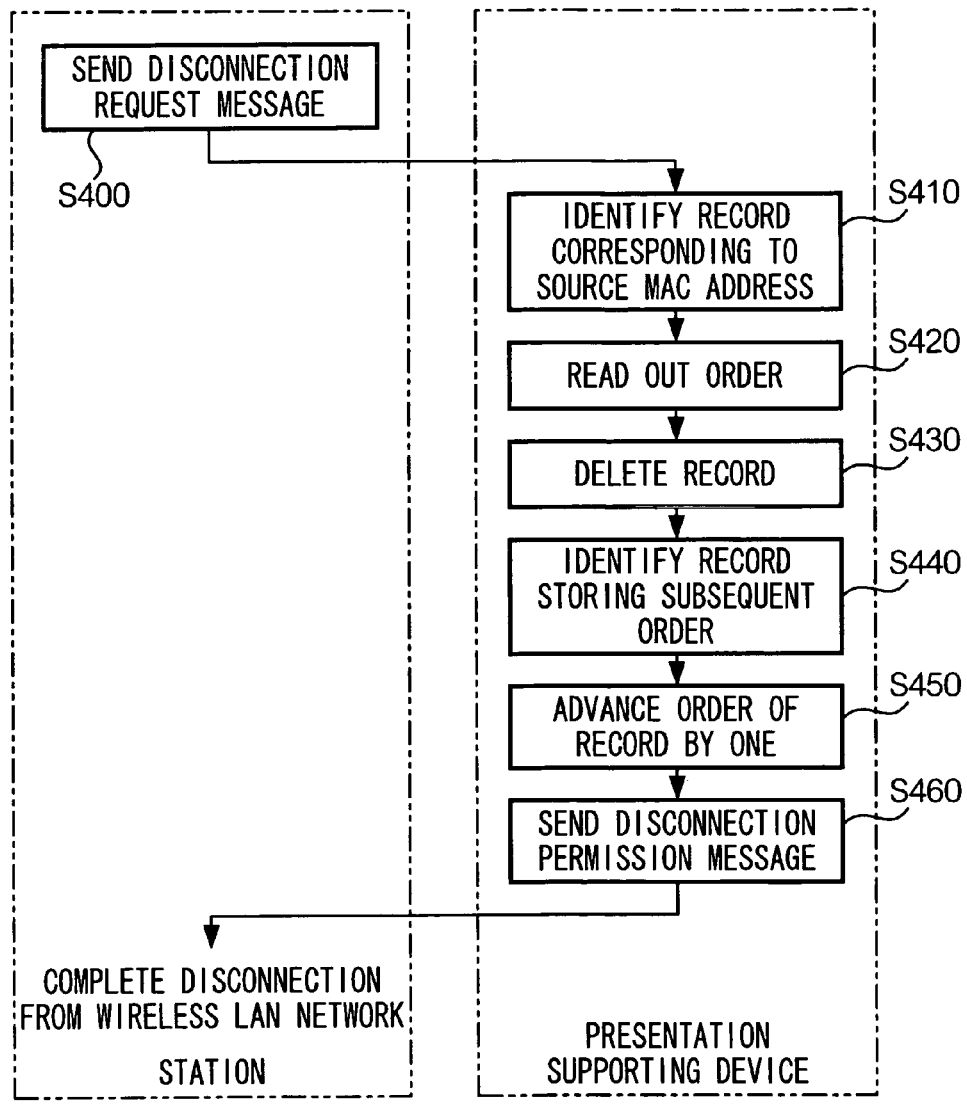

FIG. 14

ORDERS ASSIGNED WITH EACH PARTICIPANT ARE SHOWN BELOW. FOR RESETTING, PLEASE INPUT ORDER IN ORDER-INPUTTING COLUMN

| STATION ID | ORDER |
|---|---|
| A A A ( 2 ) | |
| B B B ( 1 ) | |
| C C C ( 3 ) | |
| D D D ( 0 ) | |

FIG. 15

| INDEX | NICKNAME | ADDRESS | DECISION-MAKING FLAG | TYPE |
|---|---|---|---|---|
| 1 | · · · | · · · | | THEME A |
| 2 | · · · | · · · | 1 | THEME B |
| 3 | · · · | · · · | | THEME C |
| 4 | · · · | · · · | | THEME B |

FIG. 16

| TYPE | ORDER |
|---|---|
| THEME A | 1 |
| THEME B | 2 |
| THEME C | 3 |

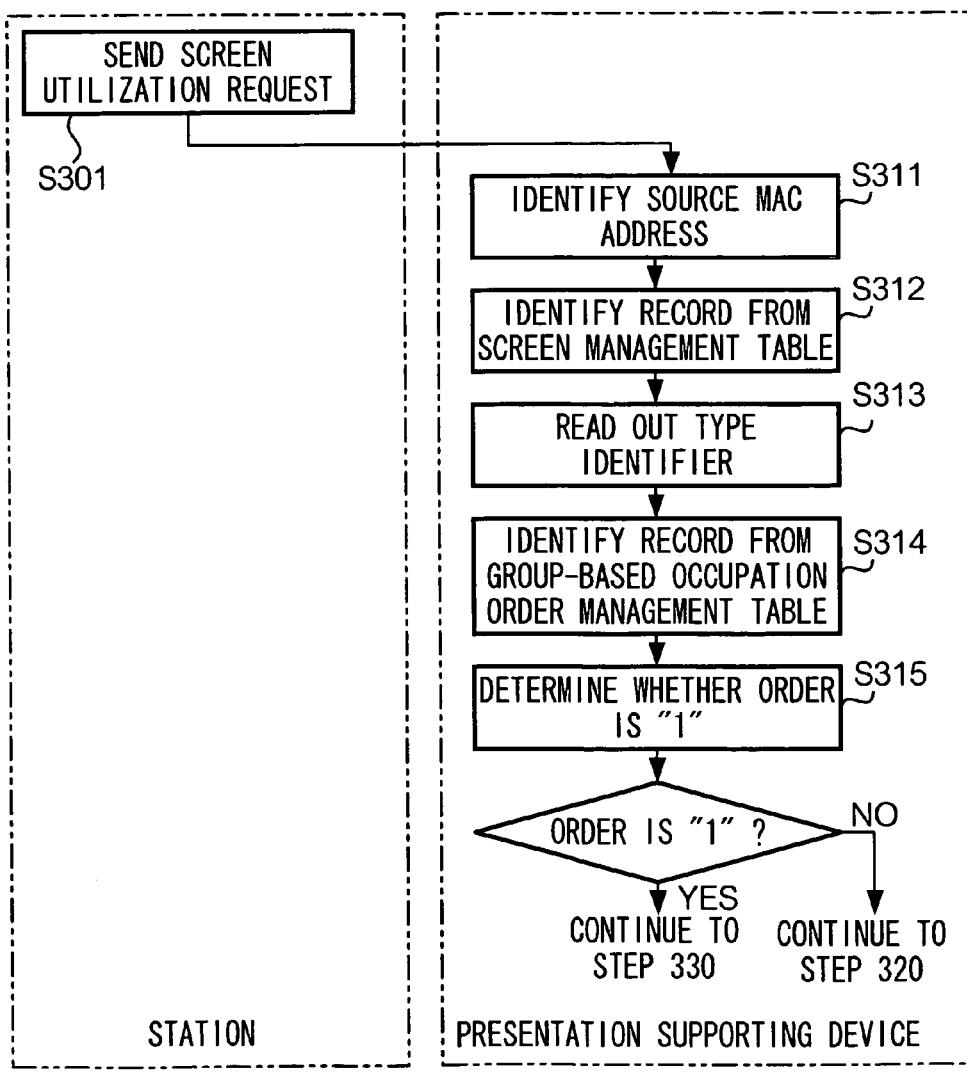

| INDEX | NICKNAME | ORDER | OCCUPATION TIME |
|---|---|---|---|
| 1 | ... | 1 | ... |
| 2 | ... | 2 | ... |
| 3 | ... | 3 | ... |
| 4 | ... | 4 | ... |

PRESENTATION SUPPORTING DEVICE AND RELATED PROGRAMS

TECHNICAL FIELD

The present invention relates to a technique for supporting a presentation using a projector.

RELATED ART

Conventionally, a presentation in which a personal computer (hereinafter, "PC") storing computerized data is connected to a projector and a presentation made by referring to data projected on a screen using the projector is generally known. Recently, the provision of a wireless LAN (Local Area Network) connection module on a PC and a projector used by participants allows the construction of a presentation environment in which a plurality of participants can use a single projector for multiple presentations. A technique for enabling a wireless presentation is also proposed (such as Japanese Patent Application Laid-Open Publication No. 2003-333559 and 2003-85112).

SUMMARY OF THE INVENTION

In any presentation involving the use of a projector by a plurality of participants, it is necessary to ensure that the presentation time allotted for each participant within a limited duration is fair, and clearly earmarked, and the operator of a presentation must assign the use of the projector to each participant for a predetermined time.

In a case a presentation environment is built using wireless LAN, each participant must perform the process of connecting a PC or disconnecting a PC already connected with the wireless LAN network, without disturbing the progress of the presentation. In such a configuration if the number of participants or members making a presentation is likely to be uncertain it would be difficult to assign the use of the projector to each participant for a fixed time.

The present invention has been made against the above described prior art, and an aim of the invention is to provide a presentation supporting device that enables a flexible management of allotting time to each participant to use a projector even in a case the number of participants during the progress of a presentation fluctuates.

A preferred embodiment of a presentation supporting device of the present invention comprises: communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen; projection means for reading image data stored in the image storing means and projecting image indicated by read image data on the screen; terminal registration means for acquiring a terminal identifier from a terminal via the communication means each time a link is established between the terminal, and for storing acquired terminal identifier in the terminal information storage means; order input means for inputting order to be given to each terminal; order-setting means for correlating the input order with each terminal identifier stored in the terminal information storage means; utilization request acquiring means for acquiring from a terminal that established the link a screen utilization request including a terminal identifier of the terminal and image data via the communication means; and projection permission determination means for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request.

Another preferred embodiment of a presentation supporting device of the present invention comprises: communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen; projection means for reading image data stored in the image storing means and projecting image indicated by read image data on the screen; terminal registration means for acquiring a terminal identifier from a terminal via the communication means each time a link is established between the terminal, and for storing acquired terminal identifier in the terminal information storage means; order input means for inputting order to be given to each terminal; order-setting means for correlating the input order with each terminal identifier stored in the terminal information storage means; utilization request acquiring means for acquiring from a terminal that established the link a screen utilization request including a terminal identifier of the terminal and image data via the communication means; projection permission determination means for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request disconnection instruction means for instructing the disconnection of link established to a specific terminal; deletion means for deleting a terminal identifier of a terminal instructed of disconnection and the terminal identifier's order from the terminal information storage means; and order advancing means for advancing one by one an order of a terminal identifier correlated with the order subsequent to the deleted order.

In the embodiment, the presentation supporting device may further comprise disconnection determination acquiring means for acquiring a set of link disconnection request and a terminal identifier via the communication means; and wherein, the disconnection instruction means, in a case that the disconnection determination acquiring means acquires a set of disconnection request and a terminal identifier, instructs the disconnection of link established between a terminal corresponding to acquired terminal identifier.

Also, the presentation supporting device may further comprise inquiry means, when an order is advanced by order advancing means, that determines on the basis of storage contents of the terminal information storage means whether a terminal identifier correlated with the first order changes after the advancement; and each time a terminal identifier correlated with the first order changes, sends via the communication means to the address of a terminal corresponding to the terminal identifier a message inquiring whether a presentation is to be performed; and response acquiring means for acquiring a response for the message via the communication means; and in a case that the acquired response indicates the presentation is not to be performed, advancing an order of a terminal identifier correlated with the order subsequent to the first order.

Another preferred embodiment of a presentation supporting device of the present invention comprises communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen, and for correlating a decision-making flag indicating an authority is given for determining an occupation order of the screen with any one of the terminal identifier; projection means for reading image data stored in the image storing means and projecting image indicated by read image data on the screen; terminal registration means for acquiring a terminal identifier from a terminal via the communication means each time a link is established between the terminal, and for storing acquired terminal identifier in the terminal information storage means; order-setting request acquiring means for acquiring from a terminal the established the link, an order-setting request including a terminal identifier of the terminal and an order to be assigned to each terminal, through the communication means; order-setting means for determining whether a terminal identifier included in the order-setting request and a terminal identifier correlated with a decision-making flag by the terminal information storage means are in agreement; and in a case that the identifiers are in agreement, correlating orders identified in response to the contents of the order-setting request with each terminal identifier stored in the terminal information storage means; utilization request acquiring means for acquiring from a terminal that established the link a screen utilization request including a terminal identifier of the terminal and image data via the communication means; and projection permission determination means for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request.

Another preferred embodiment of a presentation supporting device of the present invention comprises communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen, and for correlating a decision-making flag indicating an authority is given for determining an occupation order of the screen with any one of the terminal identifier; order storage means for correlating and storing the types of the presentation with orders for allowing the occupation of the screen; projection means for reading image data stored in the image storing means and projecting image indicated by read image data on the screen; terminal registration means for acquiring a terminal identifier from a terminal via the communication means each time a link is established between the terminal, and for storing acquired terminal identifier in the terminal information storage means; order input means for inputting order to be given to each terminal; order-setting means for correlating the input order with each terminal identifier stored in the terminal information storage means; utilization request acquiring means for acquiring from a terminal that established the link a screen utilization request including a terminal identifier of the terminal and image data via the communication means; projection permission determination means for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request.

In the embodiment, the presentation supporting device may further comprise disconnection notification acquiring means for acquiring through the communication means a set of link disconnection request and a terminal identifier; deletion means, in a case that the disconnection determination acquiring means acquires a set of disconnection request and a terminal identifier for deleting acquired terminal identifier and the terminal identifier's order from the terminal information storage means; order advancing means for advancing one by one a order of a terminal identifier correlated with the order subsequent to the deleted order.

Another preferred embodiment of a presentation supporting device of the present invention comprises communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen; projection means for reading image data stored in the image storing means and projecting image indicated by read image data on the screen; terminal registration means for acquiring a terminal identifier from a terminal via the communication means each time a link is established between the terminal, and for storing acquired terminal identifier in the terminal information storage means; order input means for inputting order to be given to each terminal; order-setting means for correlating the input order with each terminal identifier stored in the terminal information storage means; utilization request acquiring means for acquiring from a terminal that established the link a screen utilization request including a terminal identifier of the terminal and image data via the communication means; and projection permission determination means for determining whether a terminal identifier included in the acquired screen utilization request and a terminal identifier correlated with the first order by the terminal information storage means are in agreement; and in a case that the identifiers are in agreement, the projection permission termination means stores in the image storage means, image data included in the screen utilization request; deletion means for deleting a pair of occupation time and a terminal identifier_correlated with a first order_from the_terminal information storage means, in a case that the occupation time elapses after the terminal information storage means starts clocking the occupation time correlated with a first order; and order advancing means for advancing one by one orders correlated with a pair of occupation time and a terminal identifier which is not deleted by the deleting means.

In the embodiment, the presentation supporting device may further comprise output means for outputting a message prompting the disconnection of a link, before occupation time correlated with the first order passes.

Another preferred program of the present invention causes a computer device to perform the steps of: terminal registration for acquiring a terminal identifier from a terminal via communication means each time a link is established between a terminal, and for storing acquired terminal identifier in terminal information storage means; order-setting for correlating input order with each terminal identifier stored in the terminal information storage means; utilization request acquiring for acquiring from a terminal the established the link a screen utilization request including a terminal identifier of the terminal, and image data via the communication means; and projection permission determination for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request; the computer device comprising: communication means for establishing a link between several terminals and exchange data between terminals to which the link is established, image storage means for temporarily storing image data representing image to be projected on a screen, terminal information storage means for storing a terminal identifier, used to identify the terminal in relation with an order to allow the occupation of the screen, and input means for inputting orders given for each terminal.

Another preferred program of the present invention causes a computer device to perform the steps of: terminal registration for acquiring a terminal identifier from a terminal via communication means each time a link is established between a terminal, and for storing acquired terminal identifier in terminal information storage means; order-setting for correlating input order with each terminal identifier stored in the terminal information storage means; utilization request acquiring for acquiring from a terminal that established the link a screen utilization request including a terminal identifier of the terminal and image data via the communication means; projection permission determination for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request; and deletion for deleting a terminal identifier of a terminal and the terminal identifier's order from the terminal information storage means, when a disconnection of link established to a specific terminal is input through input means; and order advancing for advancing one by one an order of a terminal identifier correlated with the order subsequent to the deleted order; the computer device comprising: communication means for establishing a link between several terminals and exchange data between terminals to which the link is established, image storage means for temporarily storing image data representing image to be projected on a screen, terminal information storage means for storing a terminal identifier, used to identify the terminal in relation with an order to allow the occupation of the screen, projection means for reading image data stored in the image storing means and projecting image indicated by read image data on the screen, and input means for inputting orders to be given to each terminal and a disconnection of link established to a specific terminal.

Another preferred program of the present invention causes a computer device to perform the steps of: terminal registration for acquiring a terminal identifier from a terminal via communication means each time a link is established between a terminal, and for storing acquired terminal identifier in terminal information storage means; order-setting request acquiring for acquiring from a terminal the established a link, an order-setting request including a terminal identifier of the terminal and an order to be assigned to each terminal, through communication means; order-setting for determining whether a terminal identifier included in the order-setting request and a terminal identifier correlated with a decision-making flag by the terminal information storage means are in agreement; and in a case that the identifiers are in agreement, correlating orders identified in response to the contents of the order-setting request with each terminal identifier stored in the terminal information storage means; utilization request acquiring for acquiring from a terminal that established the link a screen utilization request including a terminal identifier of the terminal and image data via the communication means; and projection permission determination for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request; the computer device comprising: communication means for establishing a link between several terminals and exchange data between terminals to which the link is established, image storage means for temporarily storing image data representing image to be projected on a screen, terminal information storage means for storing a terminal identifier, used to identify the terminal in relation with an order to allow the occupation of the screen, and projection means for reading image data stored in the image storing means and projecting image indicated by read image data on the screen.

Another preferred program of the present invention causes a computer device to perform the steps of: terminal registration for acquiring a terminal identifier from a terminal via communication means each time a link is established between a terminal, and for storing acquired terminal identifier in terminal information storage means; order input for inputting order to be given to each terminal; order-setting for correlating the input order with each terminal identifier stored in the terminal information storage means; utilization request acquiring for acquiring from the terminal that established a link a screen utilization request including a terminal identifier of the terminal and image data via communication means; projection permission determination for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request; the computer device comprising: communication means for establishing a link between several terminals and exchange data between terminals to which the link is established, image storage means for temporarily storing image data representing image to be projected on a screen, terminal information storage means for storing a terminal identifier, used to identify the terminal in relation with an order to allow the occupation of the screen, and projection means for reading image data stored in the image storing means and projecting image indicated by read image data on the screen.

Another preferred program of the present invention causes a computer device to perform the steps of: terminal registration for acquiring a terminal identifier from a terminal via communication means each time a link is established between a terminal, and for storing acquired terminal identifier in terminal information storage means; order input means for inputting order to be given to each terminal; order-setting means for correlating the input order with each terminal identifier stored in the terminal information storage means; utilization request acquiring means for acquiring from a terminal that established the link a screen utilization request including a terminal identifier of the terminal and image data via the communication means; and projection permission determination means for determining whether a terminal identifier included in the acquired screen utilization request and a terminal identifier correlated with the first order by the terminal information storage means are in agreement; and in a case that the identifiers are in agreement, the projection permission determination means stores in the image storage means, image data included in the screen utilization request; deletion means for deleting a pair of occupation time and a terminal identifier_correlated with a first order from the_terminal information storage means, in a case that the occupation time elapses after the terminal information storage means starts clocking the occupation time correlated with a first order; and order advancing means for advancing one by one orders correlated with a pair of occupation time and a terminal identifier which is not deleted by the deleting means; the computer device comprising: communication means for establishing a link between several terminals and exchange data between terminals to which the link is established; image storage means for temporarily storing image data representing image to be projected on a screen; terminal information storage means for storing a terminal identifier, used to identify the terminal in relation with an order to allow the occupation of the screen; and projection means for reading image data stored in the image storing means and projecting image indicated by read image data on the screen.

BRIEF DESCRIPTION OF THE DRAWINGS

FIG. 2 is a hardware configuration of a presentation supporting device.

FIG. 3 is a data configuration diagram of a station management table.

FIG. 4 is a hardware configuration of a station.

FIG. 7 is a flowchart showing the order-setting process.

FIG. 9 is a flowchart showing the presentation process.

FIG. 10 is a flowchart showing the link disconnecting process.

FIG. 11 is a data configuration diagram of a station management table.

FIG. 14 shows an order-setting window.

FIG. 15 is a data configuration diagram of a station management table.

FIG. 16 is a data configuration diagram of a group-based occupation order management table.

FIG. 19 shows a group-based order-setting window.

FIG. 20 is a flowchart showing the presentation process.

BEST MODE FOR CARRYING OUT THE INVENTION

First Embodiment

The first embodiment of the present invention will next be explained.

The present embodiment is characterized in that a device for projecting an image used in a presentation on a screen is provided with a function of being an access point of a wireless LAN network and a function for managing a schedule of a presentation.

In the following explanation, the person who joins a meeting of a presentation is referred to as [participant], and a person who organizes the proceedings of a presentation is referred to as [operator]. A terminal provided with the function of connecting to a wireless LAN network is referred to as [station].

Figure 1:
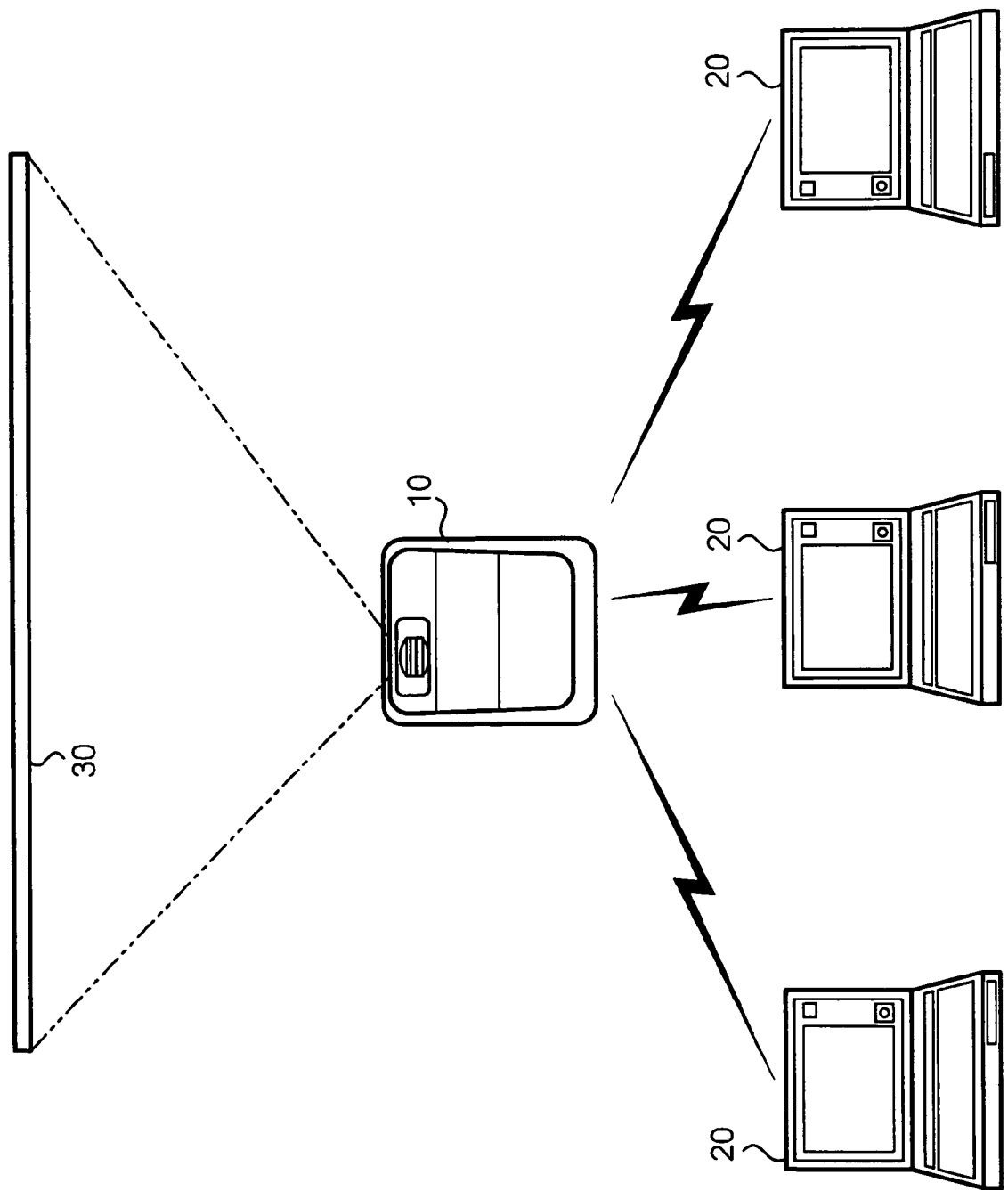
FIG. 1 is an overall configuration of a presentation system.

FIG. 1 is an overall configuration of a presentation system according to the present embodiment. As shown in the figure, the presentation system comprises a presentation supporting device 10 used by an operator, several stations 20 respectively used by each participant, and a screen 30 for displaying an image projected from presentation supporting device 10.

FIG. 2 is a block diagram showing a hardware configuration of a presentation supporting device 10.

As shown in the figure, the device comprises a control unit 11, a wireless LAN module unit 12, a hard disk 13, a main memory 14, an image-dedicated memory 15, a projection unit 16, and a touch display unit 17.

Control unit 11 controls an overall operation of a device, and comprises a CPU and a register. Wireless LAN module unit 12 establishes a link between other equipments to send and receive data.

Hard disk 13 is stored with an OS (operating system) and various programs such as a presentation supporting application that enables control unit 11 to perform operations unique to the present embodiment. Main memory 14 is used as a work area where control unit 11 performs various types of computing. Main memory 14 is also allocated an area that forms station management table for managing the status of each station 20. Image-dedicated memory 15 is used as a buffer for storing image data of image to be projected on screen 30.

FIG. 3 is a data configuration diagram of a station management table formed in main memory 14. The table is a collection of several records, each of which corresponds to one station 20. Each record forming the table includes four fields: "index"; "nickname"; "address"; and "order". In the later described link establishing process, each time a link is established between presentation supporting device 10 and station 20, a record is added to the table.

In the field of "index", numbers starting from "1" is stored in a sequence order.

Station IDs are stored in the field of "nickname". A station ID is a name temporarily given for identifying each station 20 connected to wireless LAN network; the ID is reported by each station 20 at the time of establishing a link with presentation supporting device 10.

The field of "address" stores MAC ADDRESS of each station 20.

The field of "order" stores an order for allowing each participant to perform a presentation. The storing contents of the field are respectively determined by an operator at the time of following explained order-setting process.

Projection unit 16 has a LCD (liquid crystal display), a lens, and a light source. When image data is stored in image-dedicated memory 15, projection unit 16 reads out the image data, displays image drawn on the basis of the read image data on LCD, and projects the image on screen 30 using a light source and a lens.

Touch display unit 17 controls image inputting function and image display function.

FIG. 4 is a block diagram showing hardware configuration of station 20. As shown in the figure, station 20 comprises a control unit 21, a wireless LAN module unit 22, a hard disk 23, a main memory 24, a display unit 27, and an operating unit 28.

The configurations of control unit 21, wireless LAN module unit 22, and main memory 24 are the same as those of presentation supporting device 10. Various types of image data for presentation, prepared in advance by predetermined application software are stored in hard disk 23. Display unit 27 is a liquid display of TFT (thin film transistor) type. Operating unit 28 includes such as a mouse and a keyboard.

The exchange of data between wireless LAN module unit 22 of station 20 and wireless LAN module unit of presentation supporting device 10 is performed using a protocol for Ethernet (trademark). In a protocol for Ethernet, data is distributed in a predetermined format called "frame"; and thus, an explanation with regard to the format of the "frame" will next be given.

"Frame" is generally classified into two types: a frame that does not include transmitting data to be passed to applications of other nodes; a frame that includes transmitting data to be passed to applications of other nodes.

Figure 5A:
FIG. 5 is a diagram showing the format of a frame.
Figure 5B:
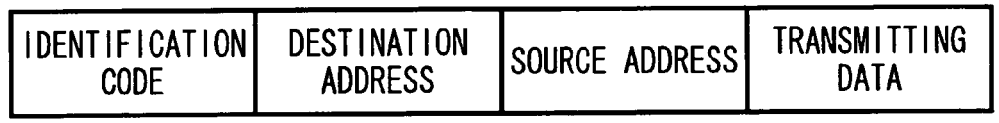

FIG. 5(*a*) is a diagram showing the format of a frame that does not include transmitting data to be passed to applications of other nodes; FIG. 5(*b*) is a diagram showing the format of a frame that includes transmitting data to be passed to applications of other nodes. A process for establishing a link with other nodes, or a process for disconnecting links with other nodes is realized by exchanging a frame shown in FIG. 5(*a*). Conversely, in a case that a link is in the state of being established, data transfer in an application level is realized by exchanging a frame shown in FIG. 5(*b*).

A frame shown in FIG. 5(*a*) is formed by blocks such as an identification code, a destination address, a source address. A block of identification code contains code information representing the type of a frame. The code information includes an access demand, an access permission, disconnection request, disconnection permission, and data transmission. A destination address and a source address respectively indicate a destination and a source of a frame by a MAC address of each node. When receiving a frame, a node authenticates a destination address with its MAC address and determines whether the frame is destined to the node; if not, the node abandons the frame. Similarly, by referring to a source address, a node identifies a source node of a frame. In a case that a frame is destined to every node, an identifier called "broadcast (BC)" is written in the frame as a destination address. A frame shown in FIG. 5(*b*) has a block of transmission data located backward of a source address. The block of transmission data may include such as image data or a message to be transferred to an application.

Operations of the present embodiment will next be explained.

Operations of the present embodiment are divided broadly into a link establishment process, an order-setting process, a presentation process, a link disconnection process.

Figure 6:
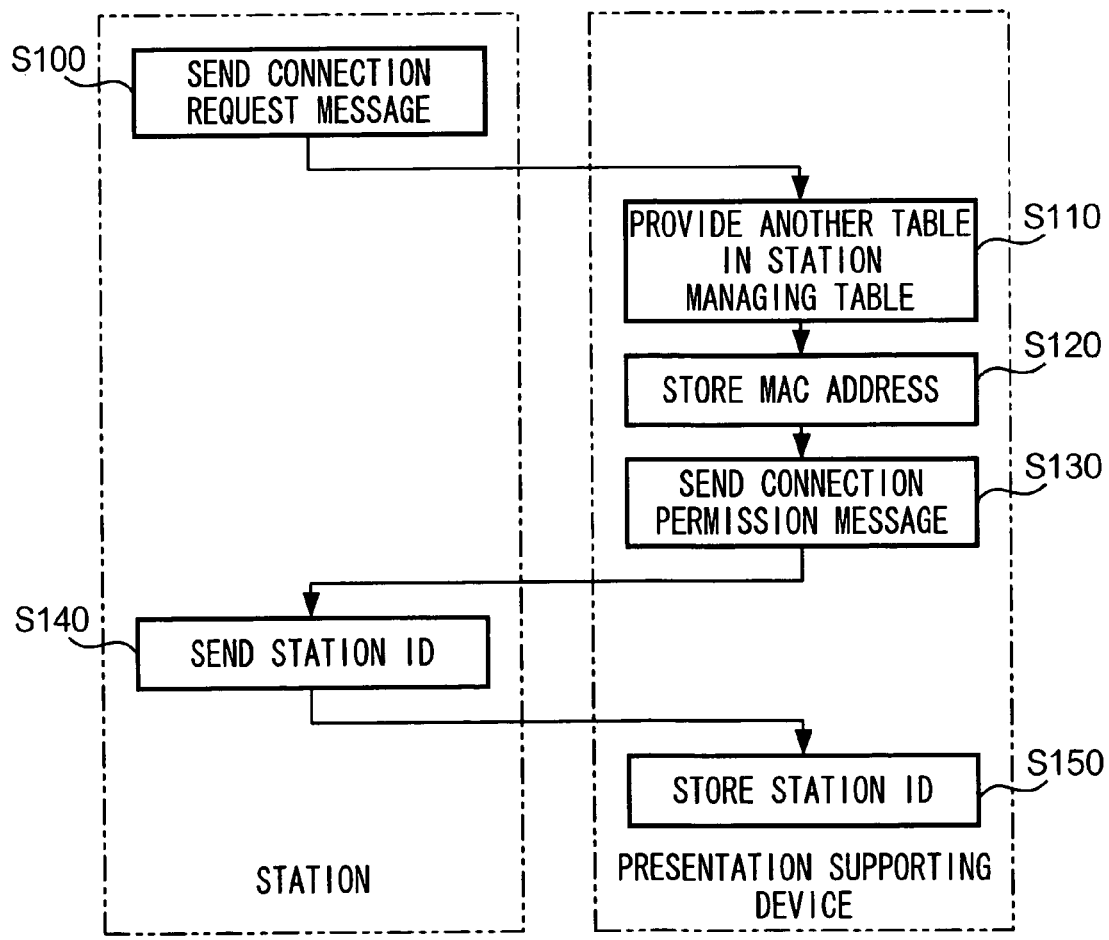
FIG. 6 is a flowchart showing the link establishing process.

FIG. 6 is a flowchart showing the link establishment process.

Link establishment process gets started when a participant performs a predetermined preparation work on their station 20 to give an operation for instructing the establishment of a link to presentation supporting device 10. It should be noted that preparation work to be performed includes an installation of predetermined GUI (graphical user interface) software, or inputting a feature such as SSID (subsystem identification) provided by an operator which can be a predetermined nickname that can be identified in wireless LAN network.

When a preparation work ends and an operation to instruct an establishment of a link to presentation supporting device 10 is given, control unit 21 of station 20 sends a connection request message (S100).

A frame representing the connection request message is formed by a format shown in FIG. 5(*a*); the format is comprised by a connection request (identification code), BC (destination address), and MAC address of the station (source address). The reason that destination address is "BC" is that station 20 has not acquired MAC address of presentation supporting device 10.

Control unit 11 of presentation supporting device 10 which received the connection request message creates an additional record to a station management table forming main memory 14 (S110). Then, in the "address" field of the record, the control unit stores MAC address included in the connection request message as a source address (S120).

Then, control unit 11 sends connection permission message to station 20, a source of the connection request message (S130). A frame indicating the connection permission message has the same type of format as shown in FIG. 5(*a*); the identification code of the frame is "Connection Permission".

Control unit 21 of station 20 that received the message, sends station ID to presentation supporting device 10 (S140). Control unit 21 may either send a nick name input in the above-described preparation work as a station ID for its identification or other information as a station ID.

Control unit 11 of presentation supporting device 10 that received the station ID stores the ID in the "nick name" field of a record created at step 110 (S150).

As a result of the process, the link establishment process ends.

Each participant performs the above-explained process and connects their station 20 to wireless LAN network.

FIG. 7 is a flowchart showing the order-setting process.

This process starts on a condition that an operator performs an operation for instructing an order-setting while at least more than two stations 20 have a link established to presentation supporting device 10. Although the operation is required to be performed at the time of starting a meeting of presentation, the timing for performing the operation is optional; each time another station 20 accesses wireless LAN network while the meeting is in progress, an order-setting may be performed.

When an operation is performed for instructing an order-setting, control unit 11 of presentation supporting device 10 reads out station ID stored in each record of station management table and displays on touch display unit 17 an order-setting window drawn on the basis of read station ID (S200).

Figures 8, 17:
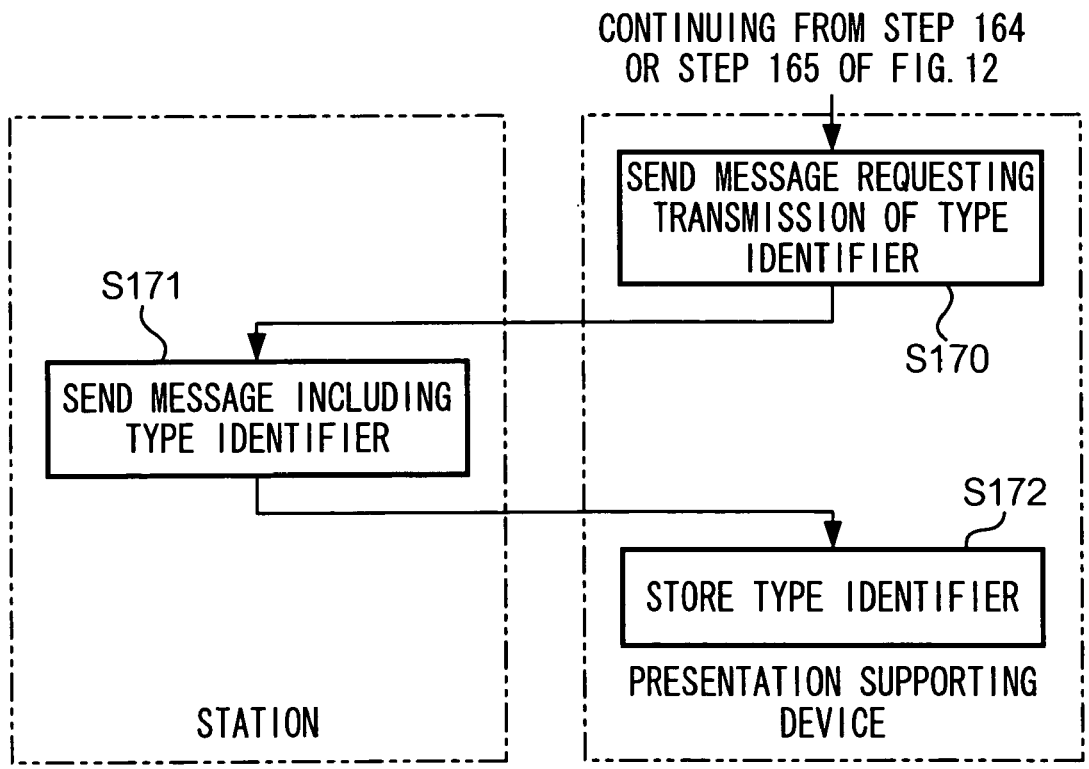
FIG. 8 shows an order-setting window.
FIG. 17 is a flowchart showing the link establishing process.

FIG. 8 shows an order-setting window. In the upper section of the window, a text containing a message saying "please input orders for allowing a participant to occupy a screen"; in the lower section of the window, order-inputting columns corresponding to each station ID are displayed. In the example shown in FIG. 8, four order-inputting columns corresponding to four station IDs "AAA", "BBB", "CCC", and "DDD" are displayed. An operator respectively inputs orders for allowing the occupation of screen 30 as the executor of a presentation to inputting columns corresponding to each station ID.

Control unit 11 of presentation supporting device 10 stores input orders in "order" field of station management table S230). For the field where data is already stored, orders input in order-setting window are overwritten. Following S230, control unit 11 reads out sets of station ID and order from a station management table, generates image data representing the correspondences between station ID and order of each participant, and stores the data in image-dedicated memory 15 (S250). Then, projection unit 16 immediately reads out the stored image data to project the image drawn on the basis of read image data on screen 30. By referring to the image, each participant is able to realize the orders set by an operator.

FIG. 9 is a flowchart showing the presentation process. Each participant performs an operation for instructing the transmission of image data in station 20 connecting to wireless LAN network to start the process. As described, each participant stores one or a plurality of image data prepared for their presentation using predetermined application software in hard disk 23 of station 20. When a participant performs an operation for instructing the transmission of any one of image data prepared by them, a presentation process gets started.

It should be noted that, to distinguish a participant who is assigned "1", the earliest order, the participant is referred to as "Occupation Acquirer Participant"

When an operation for instructing the transmission of image data is performed, control unit 21 of station 20 sends screen utilization request including the image data to presentation supporting device 10 (S300).

The frame indicating the screen utilization request has the type of format shown in FIG. 5(*b*); the frame is formed by such as data transmission (identification code), MAC ADDRESS (destination address) of presentation supporting device 10, MAC address of the station (source address), and image data (transmission data).

Control unit 11 of presentation supporting device 10 that received the screen utilization request determines whether the projection of image represented by image data included in the utilization request is to be permitted (S310).

The determination is made by verifying the MAC address of the source of screen utilization request with the contents stored in a station management table. As described above, a frame indicating a screen utilization request includes a MAC ADDRESS of source station 20; thus, in a case that the MAC ADDRESS agrees with a MAC ADDRESS stored in a record, wherein the contents of "order" field is "1", the control unit determines that the projection of image is to be permitted.

When the projection of image is permitted, control unit 11 stores in image-dedicated memory 15 image data included in the screen utilization request (S320). Then, projection unit 16 immediately reads out the stored image data to project the image drawn on the basis of read image data on screen 30. Conversely, in a case that the projection of image is not permitted, the control unit abandons the screen utilization request (S330).

As a result of the above process being performed, only the contents of image data sent from station 20 of occupation rights acquirer participant is projected on screen 30.

The occupation rights acquirer participant changes the image projected on screen 30 by repeating the works of sequentially selecting their image data prepared and instructing the transmission of the data, thereby performing their presentation.

FIG. 10 is a flowchart showing the link disconnecting process.

The process gets started when a participant performs an operation for instructing the disconnection of link; it is possible to perform the disconnection at an arbitrary timing as long as a link is established. The disconnection is ideally performed at the point of ending the presentation performed by an occupation rights acquirer participant; however, the disconnection may also be performed when a participant other than an occupation rights acquirer participant leaves a presentation room during the middle of the presentation.

When an operation for instructing the disconnection of a link is performed, control unit 21 of station 20 sends a disconnection request message to presentation supporting device 10 (S400).

A frame indicating the disconnection request message has the type of format shown in FIG. 5(*b*), and the identification code of the frame is "disconnection request".

Control unit 11 of presentation supporting device 10 which received the disconnection connection request message identifies from a station management table the record corresponding to the MAC address of a source from which the message is sent (S410). Then, the control unit reads out the order stored in the "order" field of the identified record (S420).

Control unit 11 then deletes the record identified at step 410 from station management table (S430), and among the records other than the record deleted at step 420, identifies the record storing in "order" field the order which is subsequent to the order read at step 420 (S440).

The control unit then advances the order of the identified record stored in "order" field by one (S450). More specifically, when an occupation rights acquirer participant intending to end a presentation sends a disconnection request message from their station 20, the order identified at step 420 is "1", and all of the remaining records stored in station management table are advanced one by one.

After deleting the record, control unit 11 sends a disconnection permission message to station 20; the source from which the disconnection request message is sent (S460).

A frame indicating the disconnection permission message has the format type shown in FIG. 5(*a*); the identification code of the frame is "Disconnection Permission".

This is the end of a link disconnecting process, and the disconnection of station 20 that sent a disconnection request message from a wireless LAN network ends.

In the present embodiment described above, by performing an operation for instructing an order-setting, an operator has full command of determining the orders for allowing station 20 of each participant to occupy a screen. The instruction for order-setting is performed at an arbitrary timing; thus, in response to the changes in situation such as station 20 of another participant joins wireless LAN network during the middle of a presentation meeting, or station 20 of a participant which was already connected leaves the meeting, it is possible to manage the progress of the presentation with flexibility. Furthermore, when an occupation rights acquirer participant who is given permission to occupy a screen in the order set by an operator performs an operation for disconnecting a link after a presentation ends, a record for managing information of the occupation rights acquirer participant is deleted from a station management table; and then, the participant allocated with the order subsequent to the occupation rights acquirer participant is able to perform a presentation as the next occupation rights acquirer participant.

Second Embodiment

In the first embodiment, an authority for determining the orders for allowing the occupation of screen 30 belong to an operator, and a setting or changes of an order to be assigned to each participant is performed only thorough an order-setting window displayed on touch display unit 17 of presentation supporting device 10. Conversely, in the present embodiment, an authority for determining an order is given to a specific participant in advance; accordingly, the order is set following the information sent from station 20 of the participant.

In the following explanation, to distinguish from other participants, a participant who is given an authority for determining the orders to allow the occupation of screen is referred to as "decision-making acquired participant". An operator and a decision-making acquired participant may be the same person.

Similar to the configuration of a first embodiment, a presentation system of the second embodiment also includes presentation supporting device 10, a plurality of stations 20 and screen 30. The hardware configuration of station 20 of the second embodiment is the same as that of the first embodiment. However, it should be noted that a decision-making acquired identifier is pre-stored in hard disk 23 of station 20 of a decision-making acquired participant. The identifier is a unique character string previously acquired by a decision-making acquired participant from an operator presentation; the identifier is used by supporting device 10 as authentication information for determining station 20 of a decision-making acquired participant.

The hardware configuration of presentation supporting device 10 is the same as that of the first embodiment, except that the contents of a station management table formed in main memory 14 differs from FIG. 3 and that the above-described decision-making acquired identifier is previously stored in hard disk 13.

FIG. 11 is a data configuration diagram of a station management table. Each record forming the table contains five fields: "index"; "nickname"; "address"; "order"; and "decision-making flag". The contents stored in the fields of "index", "nickname", "address", and "order" are the same as that of the first embodiment. In the "decision-making flag field, "1" is stored as a flag indicating a decision-making acquired participant.

Operations of the present embodiment will next be explained. Similar to the first embodiment, the operations in the present embodiment are categorized broadly into: a link establishment process, an order-setting process, a presentation process, and a link disconnecting process. The contents of presentation process and link disconnecting process are the same as that of the first embodiment. On the contrary, the contents of link establishment process and order-setting process differ from that of the first embodiment.

Figure 12:
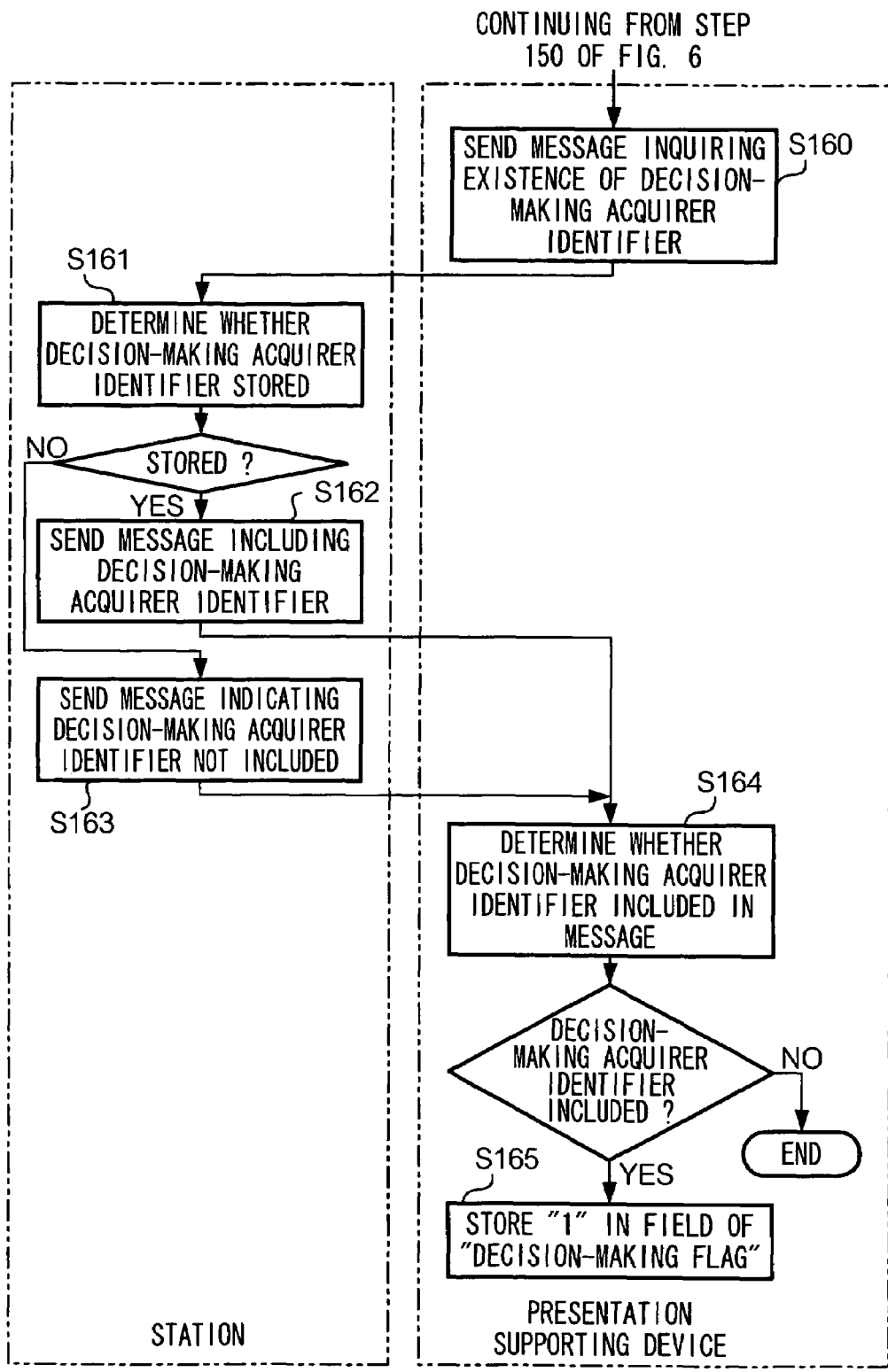
FIG. 12 is a flowchart showing the link establishing process.

FIG. 12 is a flowchart showing the link establishment process. In the link establishment process of the present embodiment, control unit 11 of presentation supporting device 10 that stored station ID at step 150 shown in FIG. 6 sends to station 20, the source of a connection request message, a message inquiring whether the station includes a decision-making acquired identifier (S160).

Control unit 21 of station 20 that received a message refers to its hard disk 23 to determine whether a decision-making acquired identifier is stored (S161).

In a case that a decision-making acquired identifier is stored, control unit 21 reads out a decision-making acquired identifier 21 from hard disk 23 and sends a message including the identifier to presentation supporting device 10 (S162). Conversely, in a case that a decision-making acquired identifier is not stored, the control unit sends to presentation supporting device 10 a message indicating that no decision-making acquired identifier is stored (S163).

Control unit 11 of presentation supporting device 10 that received the message, determines whether a decision-making acquired identifier is included in the message (S164).

In a case that a decision-making acquired identifier is included, control unit 11 identifies a record corresponding to the MAC address of the message source and stores "1" in "decision-making flag" field of the identified record (S165). Conversely, in a case that a decision-making acquired identifier is not included at step 164, the process does not proceed to step 165 and the process ends.

Figure 13:
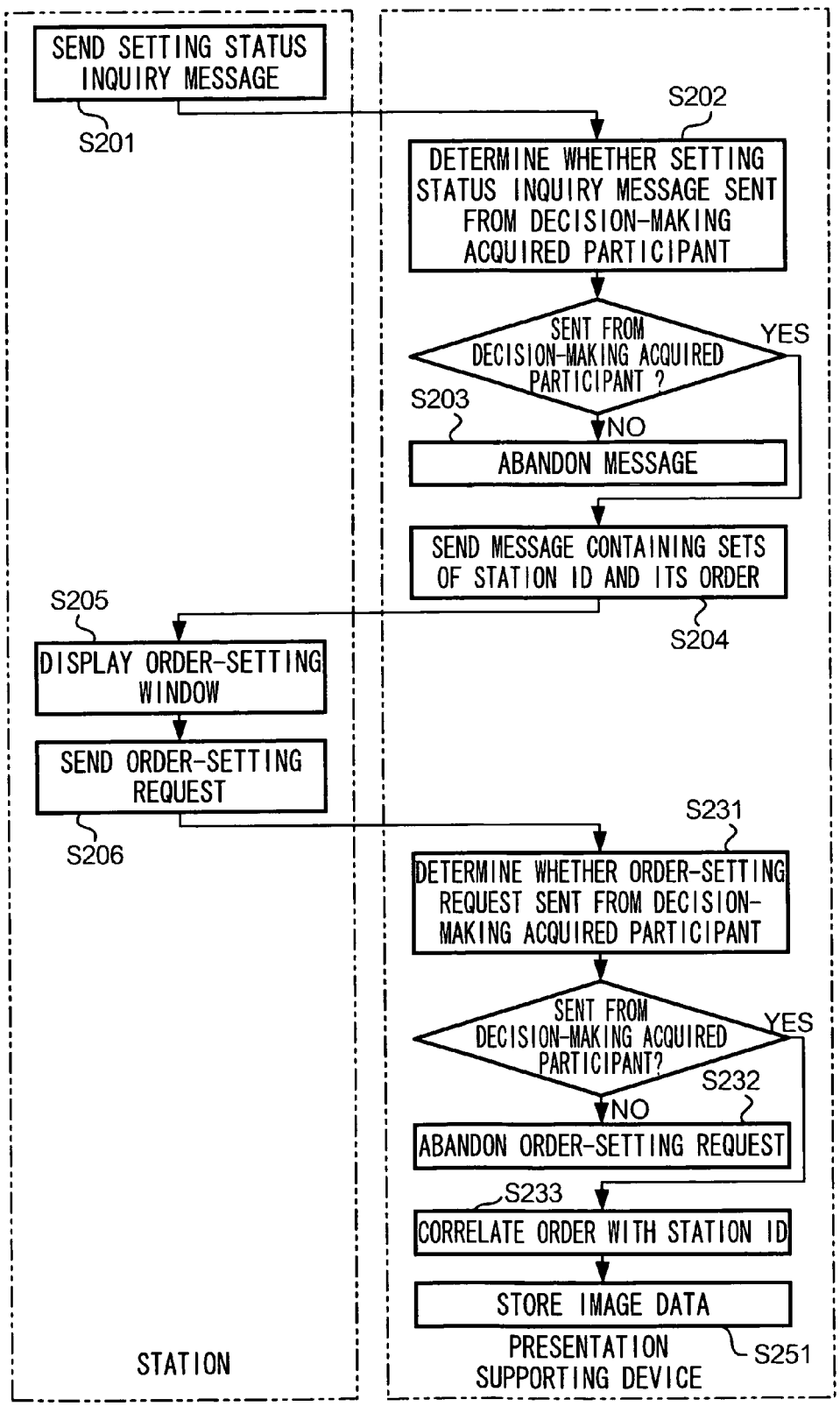
FIG. 13 is a flowchart showing the order-setting process.

FIG. 13 is a flowchart showing the order-setting process. The order-setting process of the present embodiment is started during the state wherein at least two stations 20 including station 20 of a decision-making acquired participant has a link established to presentation supporting device 10 and a decision-making acquired participant performs an operation for instructing an order-setting. Similar to the order-setting process of the first embodiment, the operation is performed at arbitrary timing.

When the operation for instructing the order-setting is performed, control unit 21 of station 20 sends a setting status inquiry message to presentation supporting device 10 (S201).

Control unit 11 of presentation supporting device 10 that received a setting status inquiry message determines whether the message is sent from station 20 of decision-making acquired participant (S202). The determination is made by matching the MAC address of the source from which a setting status inquiry message is sent along with the contents of a station management table. A frame indicating a setting status inquiry message includes a MAC address of a source from which the message is sent. Thus, in a case that the MAC address agrees with the MAC address stored in a record where the field contents of "decision-making" flag has a value of "1", a determination is made that the message is sent from station 20 of a decision-making acquired participant.

In a case that the message is not sent from station 20 of the decision-making acquired participant, control unit 11 abandons the received message (S203). Conversely, in a case that the message is not sent from station 20 of the decision-making acquired participant, the control unit reads out the set of station ID and its order from a station management table and sends a message including the read set to station 20, the source of a setting status inquiry message (S204).

Control unit 21 of station 20 that received the message displays an order-setting window on display unit (S205).

FIG. 14 shows an order-setting window. In the upper section of the window, a text saying "Orders assigned with each participant are shown below. For resetting the orders, please input them in order-inputting window." is displayed. In the lower section of the window, order-inputting columns corresponding to each station ID are displayed. The numbers in the brackets on the right side of each station ID in the window indicate the orders currently set. In the example of FIG. 14, the order in the bracket on the right side of "DDD" among 4 station IDs shows "0" which indicates the state that the order is not yet set. An operator inputs in each input-column the orders for each respective presentation ID.

Control unit 21 of station 20 sends to presentation supporting device 10 an order-setting request including a set of input order and station ID (S206).

Control unit 11 of presentation supporting device 10 that received an order-setting request determines whether the request is sent from station 20 of decision-making acquired participant (S231). The determination, similar to step 202, is made by matching the MAC address of the source, from which setting status inquiry message is sent, with the contents of a station management table.

When determining that the order-setting request is not sent from station 20 of the decision-making acquired participant, control unit 11 of presentation supporting device 10 abandons the request (S232). Conversely, when determining that the order-setting request is not sent from station 20 of the decision-making acquired participant, control unit 11 of presentation supporting device 10 correlates the orders identified in response to the contents of said order-setting request with each terminal station ID in station management table (S233).

Then, control unit 11 reads out a set of station IDs and their order from a station management table, generates image data representing the correspondence between the station IDs of each participant and its orders, and stores the data in image-dedicated memory 15 (S251). Then, projection unit 16 immediately reads out the stored image data to project the image drawn on the basis of read image data on screen 30. By referring to the image, each participant is able to realize the orders set by an operator.

In the present embodiment explained above, when station 20 of a participant who is given an authority to determine orders sends an order-setting request to presentation supporting device 10, the orders to be assigned with each participant is set depending on the contents of the order-setting request. Accordingly, in a case that an operator is required to perform a presentation as one of the members of participants, the operator is able to manage the proceedings in a meeting without operating both their station 20 and presentation supporting device 10.

Third Embodiment

In the two embodiments stated above, either an operator or a decision-making acquired participant sets an order of occupying screen 30 for each participant. Conversely, in the present embodiment, several participants performing the same type of presentation are formed into same groups, and an order is set for the groups.

The presentation of the present embodiment, similar to the two embodiments described above, comprises presentation supporting device 10, several stations 20, and screen 30. The hardware configuration of station 20 is the same as that of the first embodiment. In the present embodiment, a type identifier is previously stored in hard disk 23 of each station 20. The type identifier is a unique character string representing the type of theme in presentation performed by each participant. Before connecting each station 20 to wireless LAN network, each participant notifies the type of theme in presentation to an operator and acquires the type identifier indicating the type from the operator so as to store them in hard disk 23 of station 20.

The hardware configuration of presentation supporting device 10 differs from the two embodiments described above in that both station management table and group-based occupation order management table are provided in main memory 14.

FIG. 15 is a data configuration diagram of a station management table. Each record forming the table contains five fields: "index"; "nickname"; "address"; "decision-making flag"; "type". The contents stored in the fields of "index", "nickname", "address", and "decision-making flag" are the same as the table shown in FIG. 11. A type identifier sent from each station 20 in the later-described link establishment process is stored in the "type" field. The identifier is a unique character string representing the type of theme in presentation.

FIG. 16 is a data configuration diagram of a group-based occupation order management table. Each record forming the table contains two fields: "type"; and "order". A type identifier is pre-stored in "type" field. Each storage content of the field is determined by a decision-making acquired participant in the later-described order-setting process.

Operations of the present embodiment will next be explained. Similar to the first and second embodiments, the operations in the present embodiment is also categorized broadly into: a link establishment process, an order-setting process, a presentation process, and a link disconnecting process.

FIG. 17 is a flowchart showing the link establishment process. The link establishment process in the present embodiment differs from the second embodiment in the process following step 165 shown in FIG. 12. In the present embodiment, control unit 11 of presentation supporting device 10 that performed either the process of step 164 or the subsequent step 165 shown in FIG. 12 sends a message requesting the transmission of a type identifier to station 20, the source from which a connection request message is sent (S170).

When receiving the message, control unit 21 of presentation supporting device 20 reads out a type identifier stored in its hard disk 23 and sends a message containing the type identifier to presentation supporting device 10 (S171).

When receiving the message, control unit 11 of presentation supporting device 10 identifies the record corresponded with a MAC address of the source from which the message is sent. The control unit stores the type identifier contained in the message in the "type" field of the identified record (S172).

This is the end of a link establishment process.

Figure 18:
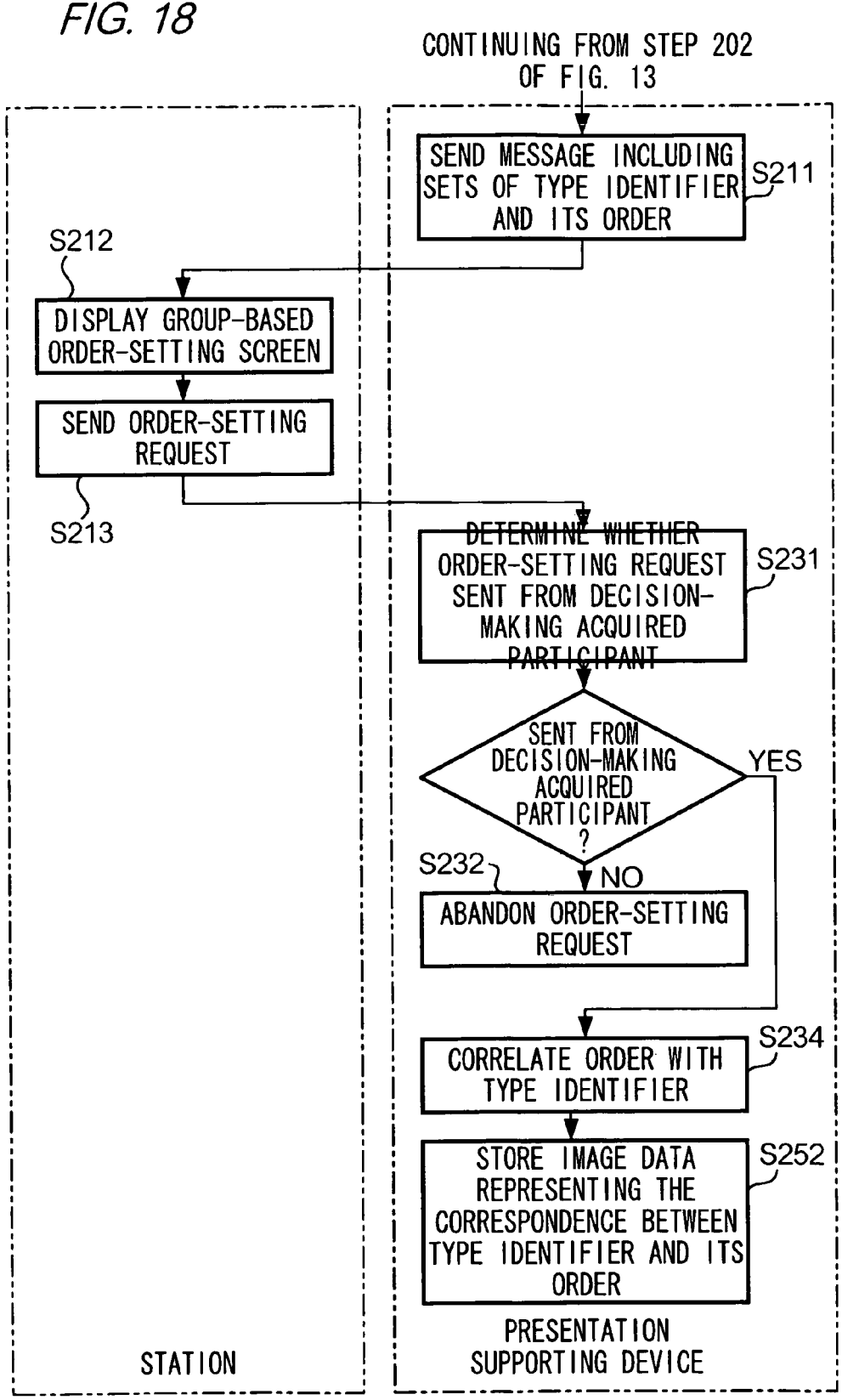
FIG. 18 is a flowchart showing the order-setting process.

FIG. 18 is a flowchart showing the order-setting process. The order-setting process of the present embodiment differs from the second embodiment following steps 203 shown in FIG. 13. In the present embodiment, control unit 11 of presentation supporting device 10, which determined in step 202 that a setting status inquiry message is sent from a decision-making acquired participant, reads out the set of a type identifier and its order from a group-based occupation order management table and sends a message containing the read set to station 20 (S211).

When receiving the message, control unit 21 of station 20 displays a group-based order-setting window on a display unit 27 (S212).

FIG. 19 shows a group-based order-setting window. In the upper section of the window, a text containing a message saying, "please input orders for allowing the occupation of a screen on a theme of presentation basis " is displayed; in the lower section of the window, an order-inputting column for theme types of presentations are displayed. In the example of FIG. 19, order-inputting columns corresponding to three types of theme A through theme C respectively are displayed. An operator inputs orders on the basis of the types of each presentation.

Control unit 21 of station 20 sends an order-setting request including the set of input order and its type identifier to presentation supporting device 10 (S213).

Control unit 11 of presentation supporting device 10 that received an order-setting request determines whether the request is sent from station 20 of decision-making acquired participant (S232). The determination, similar to step 202, is made by matching the MAC address of the source, from which setting status inquiry message is sent with the contents of a station management table.

When determining that the order-setting request is not sent from station 20 of the decision-making acquired participant, control unit 11 of presentation supporting device 10 abandons the request (S233). Conversely, when determining that the order-setting request is not sent from station 20 of the decision-making acquired participant, control unit 11 of presentation supporting device 10 correlates the orders identified in response to the contents of said order-setting request with type identifier in group-based occupation order management table (S234).

Then, control unit 11 reads out a set of type identifier and its order from a group-based occupation order management table, generates image data representing the correspondence between the type identifiers of each participant and its orders, and stores the data in image-dedicated memory 15 (S252). Then, projection unit 16 immediately reads out the stored image data to project the image drawn on the basis of read image data on screen 30. By referring to the image, each participant is able to realize the orders set by a decision-making acquired participant on a presentation type basis.

FIG. 20 is a flowchart showing the presentation process. The presentation process in the present embodiment begins when a participant performs an operation for instructing the transmission of image data in station 20 connected to wireless LAN network.

When an operation for instructing the transmission of image data is performed, control unit 21 of station 20 sends screen utilization request including the image data to presentation supporting device 10 (S301).

When receiving the screen utilization request, control unit 11 of presentation supporting device 10 identifies the source of a MAC address from which the request is sent (S311).

Control unit 11 identifies, among records in a station management table, a record whose contents of "address" field agrees with a MAC address identified at step 311 (S312). Then, the control unit reads out a type identifier stored in "type" field of the identified record (S313).

Control unit 11 identifies, among records in a group-based occupation order management table, a record whose contents of "type" field agrees with a type identifier read at step 313 (S314). Then, the control unit determines whether the contents of "order" field of the identified record is "1" which indicates the first order for projection (S315).

In a case that the contents of "order" field is "1", the process proceeds to step 330 to store image data included in the screen utilization request in image-dedicated memory 15. In a case that the contents of "order" field is not "1", the process proceeds to step 320 shown in FIG. 9 and the screen utilization request is abandoned.

Figures 21, 23:
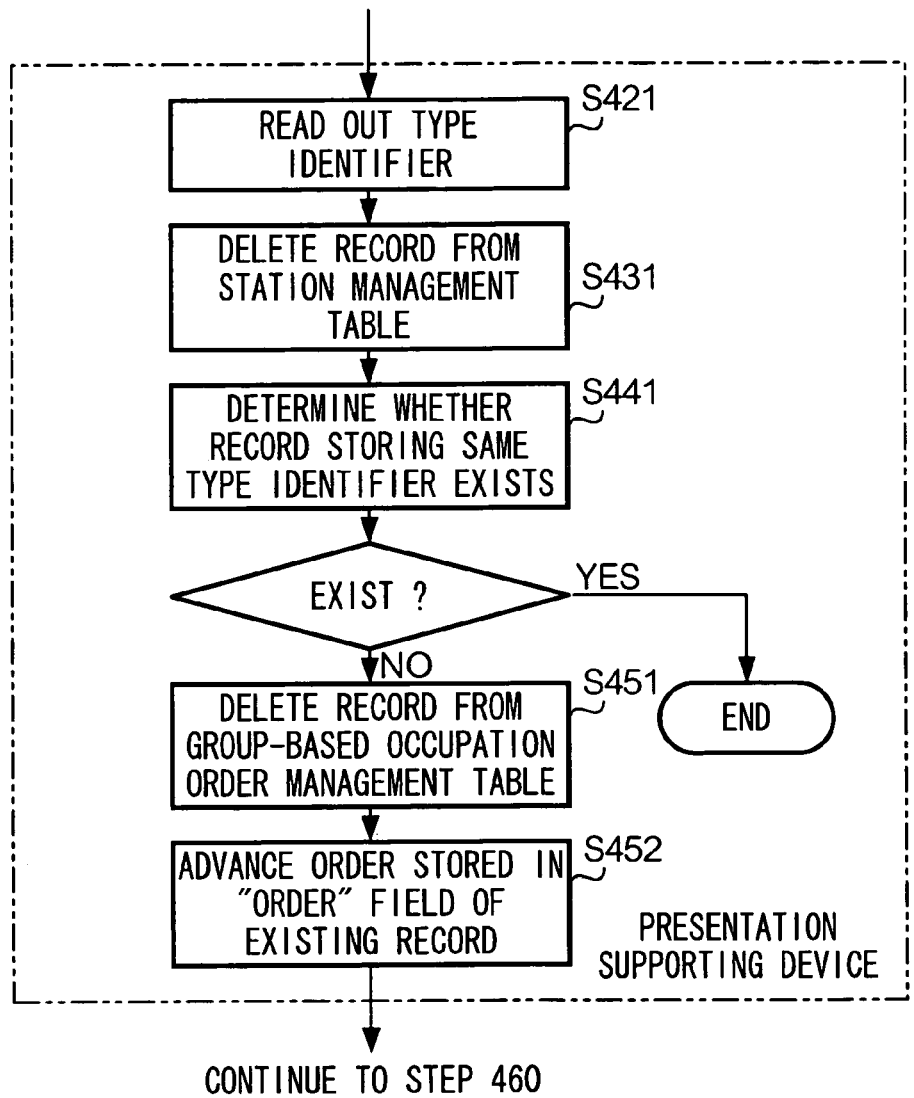
FIG. 21 is a flowchart showing the link disconnecting process.
FIG. 23 is a data configuration diagram of a station management table.

FIG. 21 is a flowchart showing the link disconnecting process. The link disconnecting process in the present embodiment differs from the first embodiment in the contents following steps 410 shown in FIG. 10. In the present embodiment, control unit 11 of presentation supporting device 10 that identified at step 410 of FIG. 10 a record corresponding to station ID, reads out the type identifier stored in "type" field of the identified field (S421). Then, the control unit deletes the record specified at step 410 from the station management table (S431).

When deleting the record, control unit 11 determines whether other records storing the same type identifier read in step 421 are included in the station management table (S441).

When it is determined that a record storing the same type identifier is not included in the table, control unit 11 identifies from a group-based occupation order management table a record storing the type identifier and deletes the identified record (S451).

Then, the control unit advances orders stored in "order" field of the records other than the record deleted at step 451 (S452); in other words, the unit advances the orders subsequent to "2" stored in the field one by one.

Control unit 11 then proceeds to step 460 of FIG. 10 to send a disconnection permission message to station 20; the source from which the disconnection request message is sent.

In the present embodiment explained above, the participants joining a presentation meeting are categorized in a same group on the basis of the type of presentation they perform, and orders are set for each group. Consequently, even in a case that a presentation to be performed includes a type, wherein participants cooperate as a team for the same theme, the present embodiment allows a smooth management of the presentation. Furthermore, even in a case that station 20 of a participant joining a group that corresponds to a specific type disconnects from a wireless LAN network, a record corresponding to the type of the group is not deleted from a group-based occupation order management table, as long as station 20 of other participants joining the group is not disconnected. As a result of the present embodiment, it is possible to avoid inconveniences such as other participants joining a specific group being obliged to end a presentation by disconnecting a station of a participant who is already part of the group.

Fourth Embodiment

In the present embodiment, station 20 of an occupation rights acquirer participant; the source of a disconnection request message, inquires a participant who is to be the next occupation rights acquirer participant whether he/she is ready for his/her presentation. In a case that he/she is not ready, the station gives permission for occupying screen 30 to a participant following the order of the participant.

Similar to the first embodiment, the presentation system of the present embodiment also comprises presentation supporting device 10, a plurality of stations 20, and screen 30. The hardware configuration of station 20 and presentation supporting device 10 is the same as described in the first embodiment.

Operations of the present embodiment will next be explained. Similar to the first embodiment, the operations in the present embodiment are categorized broadly into: a link establishment process, an order-setting process, a presentation process, and a link disconnecting process. Among the processes, the present embodiment differs from the first embodiment in the contents of link disconnecting process.

Figure 22:
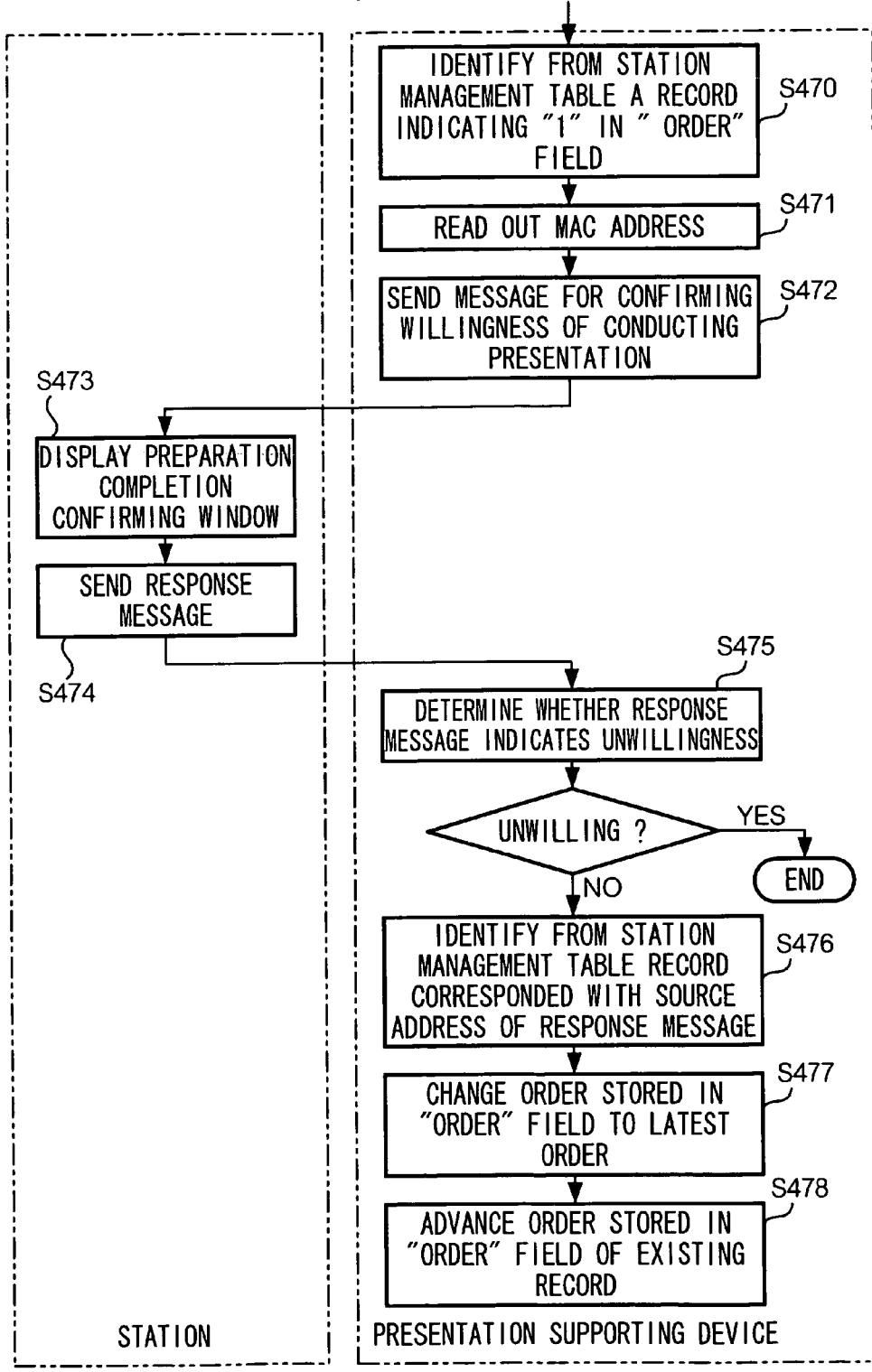
FIG. 22 is a flowchart showing the details of the link disconnecting process.

FIG. 22 is a flowchart showing the details of the link disconnecting process. The link disconnecting process in the present embodiment differs from the first embodiment in the contents following step 460 shown in FIG. 10. In the present embodiment, control unit 11 of presentation supporting device 10 that sent a disconnection permission message identifies, among the records in a station management table, a record whose contents of the "order" field is "1" (S470). Control unit 11 then reads out a MAC address stored in the "address" filed of the record identified at step 470 (S471) and sends to station 20 having the read MAC address a message inquiring whether the presentation is to be performed (S472).

Control unit 21 of station 20 that received the message displays a preparatory completion confirming window on a display unit 27 (S473). The preparatory completion confirming window displays a text saying that "Occupation of screen is permitted. If you are not ready for your presentation, the cancellation will be accepted. Making a cancellation?"; and in the lower section of the window, buttons saying "start presentation" and "cancellation" are displayed. In a case that a presentation is ready to be performed, a participant touches the button of "start presentation"; in a case that a presentation is not ready to be performed, a participant touches the button of "cancellation".

Control unit 21 sends to presentation supporting device 10 a response message including the contents of the selected button (S474).

Control unit 11 of presentation supporting device 10 that received the response message determines whether the contents of the message indicate that the presentation is not to be performed (S475).

When determining that the contents of the response message indicates that the presentation is not to be performed, control unit 11 identifies, among the records in the station management table, the record corresponding to a MAC address of a source from which the message is sent (S476). The control unit then changes the order stored in the "order" field of the identified record to the latest order at the time of the change (S477). Specifically, in a case that four records are provided in a station management table, the "order" field of the record identified at step 476 is changed from "1" to "4".

Control unit 11 then advances by one the orders stored in "order" field of the records excluding the record identified at step 476 (S478).

Conversely, in a case that the control unit determines that the contents of the response message indicate that the presentation is to be performed, the process of steps 476 to step 478 is not performed and the process ends.

In the present embodiment explained above, in a case that the source of a disconnection request message sent to presentation supporting device 10 is station 20, the supporting device sends to station 20 of a participant who is to become the next occupation rights acquirer participant a message inquiring whether a presentation is to be permitted. When the response to the message indicates that the presentation is not to be performed, permission for occupying a screen is given to the next participant. Thus, according to the present embodiment, it is possible to avoid inconveniences such as overall proceedings in the presentation meeting are suspended as a result of a participant who is permitted to occupy a screen is not ready for his/her presentation.

Fifth Embodiment

In the embodiments described above, occupation rights are not transferred to other participants unless an occupation rights obtainment participant performs an operation for instructing a link disconnection. Conversely, in the present embodiment, each participant declares in advance the estimated time for occupying screen 30. Then, presentation supporting device 10 sequentially switches the occupation rights of the screen according to the schedule of the estimated time.

The presentation system of the present embodiment, same as the embodiments described above, comprises presentation supporting device 10, a plurality of stations 20, and screen 30. The hardware configuration of station 20 is the same as that of the first embodiment.

The hardware configuration of presentation supporting device 10 is the same as that of the first embodiment, except that the contents of a station management table included in main memory 14 are different.

FIG. 23 is a data configuration diagram of a station management table. Each record forming the table contains four fields: "index", "nickname", "order", and "occupation time". The contents stored in "index", "nickname", and "order" fields are the same as that of the first embodiment. "Occupation time" field stores estimated time information. Estimated time information refers to information indicating the time of each participant occupying screen 30. As will be described later, the estimated time information is declared by each participant at the time of establishing a link between station 20 and presentation supporting device 10.

Operations of the present embodiment will next be explained.

The operations in the present embodiment are categorized broadly into: a link establishment process, an order-setting process, a presentation process, and a schedule management process. A schedule management process is a process specific to the present embodiment. Furthermore, among four processes, the contents of the link establishment process differ from that of the first embodiment.

Figure 24:
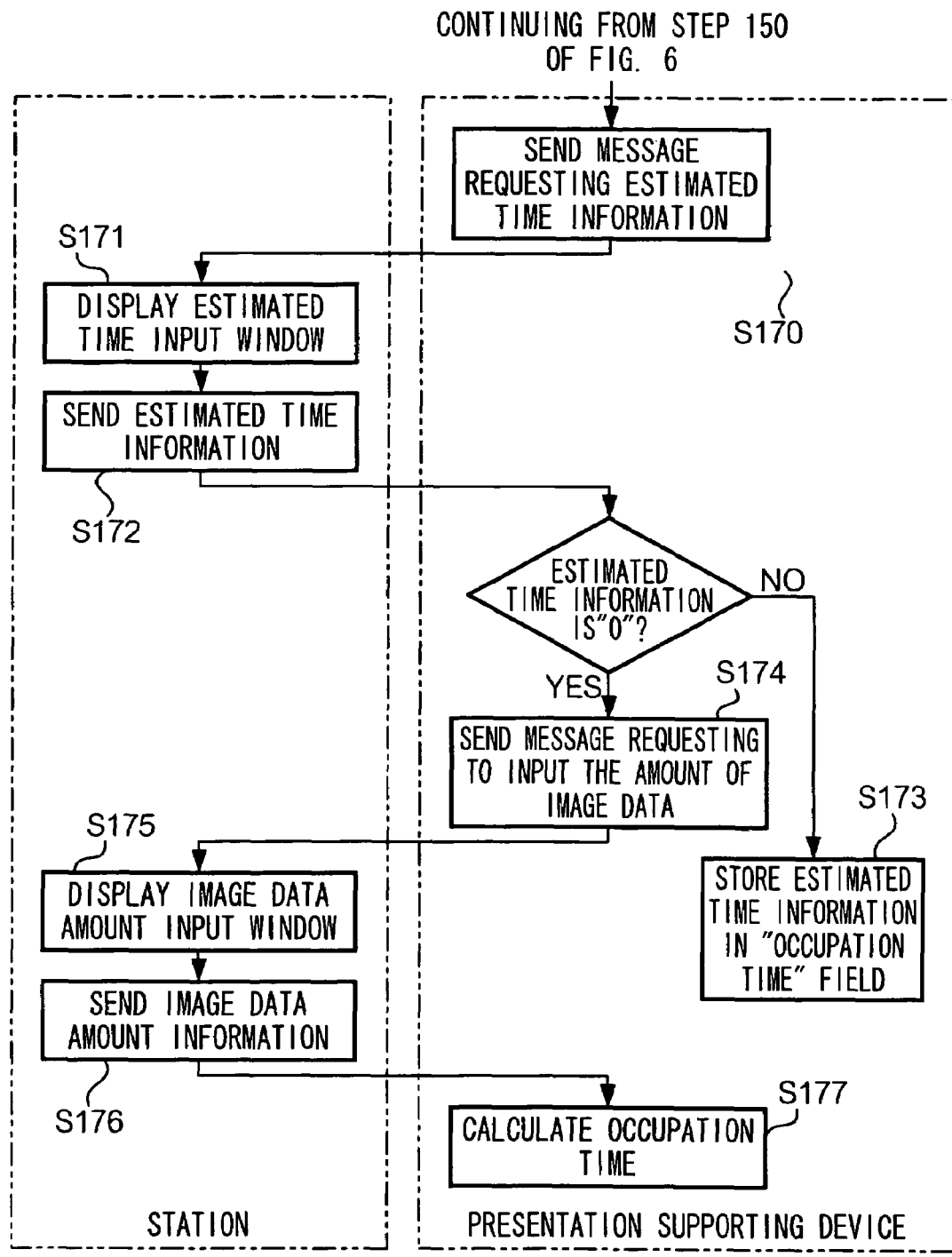
FIG. 24 is a flowchart showing the link establishing process.

FIG. 24 is a flowchart showing a link establishment process. In the link establishment process of the present embodiment, control unit 11 of presentation supporting device 10 that stored station ID at step 150 shown in FIG. 6 sends to station 20, the source of a connection request message, a message requesting the transmission of estimated time information (S170).

Control unit 21 of station 20 that received the message displays estimated time input window on display unit 27 (S171).

In the upper section of the estimated time input window, character strings indicating the contents, "Please input the time for occupying the screen" are displayed. In the lower section of the window, an input column for "occupation time" is displayed.

A participant refers to the window and inputs time to occupy the screen for a presentation in the input column of the window. In a case that the occupation time is uncertain, a user inputs "0".

Control unit 21 of station 20 sends estimated time information indicating the time input in estimated time input window to presentation supporting device 10 (S172).

When receiving the estimated time information, control unit 21 of station 20 determines whether the information indicates "0" (S173).

When determining that the estimated time information does not indicate "0", control unit 11 stores estimated time information in the "occupation time" field of the additional record created at step 110 (S174).

Conversely, when determining that the estimated time information indicates "0", control unit 11 sends to station 20 a message requesting input of the amount of image data (S175).

Control unit 21 of station 20 that received the message displays image data amount input window on display unit 27 (S176).

In the upper section of image data amount input window, character strings indicating the contents, "Please input the amount of image prepared for this presentation" are displayed. In the lower section, an input column for inputting an amount is displayed.

Referring to the window, a participant inputs in input column of the window the amount of image data for presentation prepared in advance using predetermined application software.

Control unit 21 of station 20 sends to presentation supporting device 10, image data amount information indicating the amount input through image data amount input window (S177).

When receiving the image data amount information, control unit 11 of presentation supporting device 10 combines image data amount indicated by the image data amount information with a predetermined occupation time conversion rate to calculate occupation time (S178). Specifically, in the case of converting one image data into occupation time of one minute, the multiplication of one minute by image data amount will be the "occupation time".

Then, control unit 21 of station 20 proceeds to step 174 to store estimated time information generated at step 178 in "occupation time" time field which is created at step 110.

Figure 25:
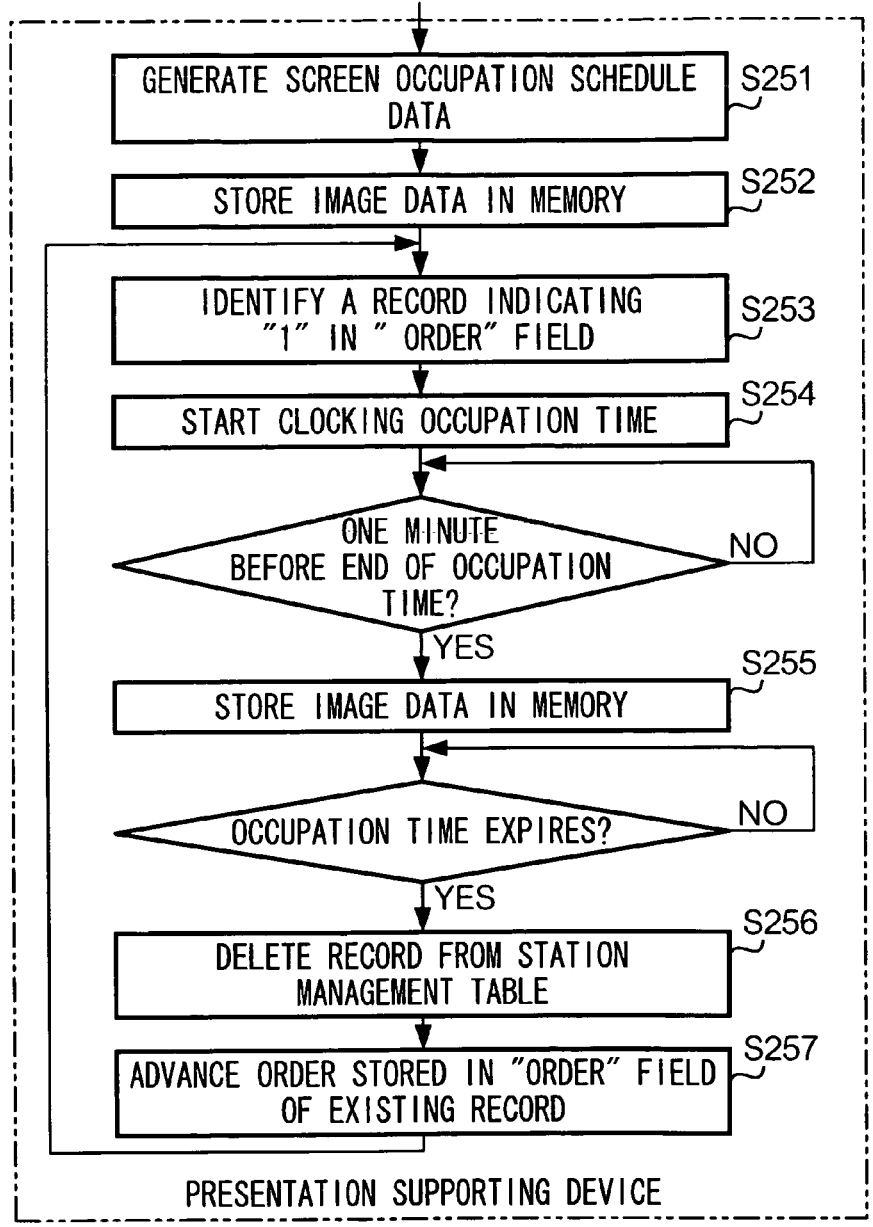
FIG. 25 is a flowchart showing a schedule management process.

FIG. 25 is a flowchart showing a schedule management process. The process gets started immediately after the order-setting process shown in FIG. 7 ends.

When performing step 250 shown in FIG. 9 to project screen 30 an image representing the correspondences between station IDs and their orders, control unit 11 of presentation supporting device 10 generates screen occupation schedule data, by referring to storage contents of "nickname" field, "order" field, and "occupation time" field (S251).

Figure 26:
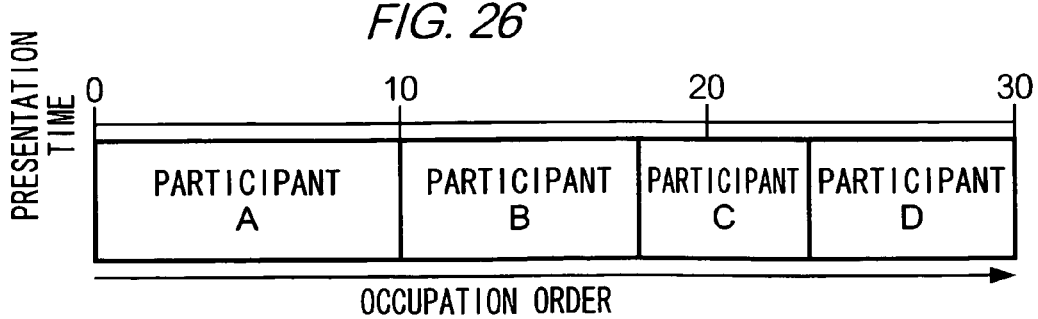
FIG. 26 is a data configuration diagram of screen occupation schedule data.

FIG. 26 is a data configuration diagram of screen occupation schedule data. The data correlates the time-base of the start to end of presentations with participants occupying screen 30. Referring to the example illustrated in the figure, the schedule indicates that participant A occupies a screen for five minutes from the start of a presentation; participant B occupies a screen for the subsequent ten minutes; participant C occupies a screen for the next seven minutes; participant D occupies a screen for the last eight minutes.

When generating screen occupation schedule data, control unit 11 generates image data representing the screen occupation schedule data for storing it in image-dedicated memory 15 (S252). Then, projection unit 16 immediately reads out the stored image data to project on screen 30 the image drawn on the basis of read image data. By referring to the image, each participant is able to realize the time allowed for himself/herself and other participants to occupy screen 30.

When the image is displayed, control unit 11 of presentation supporting device 10 is able to receive from station 20 of each participant a screen utilization request and a disconnection request message. In a case that a reply to a screen utilization request is received from any one of stations 20, a presentation process shown in FIG. 9 is performed. In a case that a reply to a disconnection request message is received from any one of stations 20, a link disconnection process shown in FIG. 21 is performed.

When performing step 252, control unit 11 of presentation supporting device 10 identifies, among the records in a station management table, a record whose contents of the "order" field is "1" (S253).

Control unit 11 then reads out estimated time information stored in "occupation time" field of the record identified in step 253 to start clocking the "occupation time" indicated by the read estimated time information (S254).

At each duration of one minute before the end of "occupation time" when clocking started at step 254, the control unit generates image data of image indicating the character strings notifying the end of an occupation of the screen and stores the generated image data in image-dedicated memory 15 (S255). Then, projection unit 16 immediately reads out the stored image data to project the image drawn on the basis of read image data on screen 30. Referring to the image, an occupation rights obtainment participant performs an operation for instructing the disconnection of a link to perform a link disconnection process of FIG. 10, in the process of which the occupation rights of the screen moves to the subsequent participant.

Conversely, in a case that "occupation time" arrives as a result of no operation being performed for instructing the disconnection of link, control unit 11 deletes from station management table, the record identified at step 253 (S256).

Control unit 11 then advances the orders of the other records stored in "order" field of the station management table by one (S256). In other words, even though no disconnection request message is sent from station 20 of the occupation rights obtainment participant, the participant is compulsorily deprived of the occupation rights of the screen.

Then the process returns to step 253, and the subsequent process is repeated until the occupation rights of the screen is given to the participant of last order.

According to the present embodiment explained above, presentation supporting device 10 receives estimated time information from station 20 of each participant and projects on screen 30 screen occupation schedule data generated on the basis of the estimated time information. Furthermore, at each duration of one minute before the end of "occupation time", the presentation supporting device projects on screen 30 a message prompting the participant occupying the screen to end the occupation. As such, each participant is notified that not much of their allotted time is left. Furthermore, when "occupation time" arrives, presentation supporting device 10 automatically changes the occupation rights of a screen. Thus, the delay in progress of a presentation is avoided.

OTHER EMBODIMENTS

The present invention is susceptible to various changes.

In each embodiment described above, a presentation supporting device stores MAC address for stations in "address" filed of a station management table, thereby identifying the station that is exchanging data with the device. Conversely, other type of information specific to each station (such as an IP address of each station) may also be used to identify each station.

In the above-described embodiments, station 20 is disconnected from a wireless LAN network only when a disconnection request message is sent from station 20 to presentation supporting device 10; conversely, a link between a specific station 20 may compulsorily be disconnected as a result of predetermined input operation at presentation supporting device 10 by an operator.

In the embodiments described above, a participant other than an occupation rights acquirer participant is also able to disconnect from wireless LAN network by sending a disconnection request message from his/her station. Conversely, the station that is allowed to transmit a disconnection request message may be limited to the station of an occupation rights acquirer participant. In a case that the first embodiment is configured by such modifications, control unit 11 of presentation supporting device 10, upon receiving a connection request message, performs a process such as issuing a switching instruction of a occupation rights acquirer participant, deleting a record corresponding to order of "1" in station management table, and advancing orders of other records stored in "order" field by one.

Also, appointment information quantitatively indicating the importance of each presentation may be given to each participant; and when a station of any participant is disconnected from a wireless LAN network, the correspondences between station IDs and the orders of each participant may be reset in a higher priority order indicated by the appointment information.

What is claimed:

1. A presentation supporting device, comprising:
communication means for establishing a link between several terminals and for exchanging data between terminals to which said link is established;
image storage means for temporarily storing image data representing an image to be projected on a screen;
terminal information storage means for storing a terminal identifier, used to identify said terminal in relation with an order to allow the occupation of said screen;
projection means for reading image data stored in said image storing means and projecting an image indicated by read image data on said screen;
terminal registration means for acquiring a terminal identifier from a terminal via said communication means each time a link is established between said terminal, and for storing an acquired terminal identifier in said terminal information storage means;
order input means for inputting an order to be given to each terminal;
order-setting means for correlating said input order with each terminal identifier stored in said terminal information storage means;
utilization request acquiring means for acquiring from a terminal that established said link a screen utilization request including a terminal identifier of the terminal and image data via said communication means; and
projection permission determination means for determining whether a terminal identifier included in said acquired screen utilization request and a terminal identifier correlated with the first order by said terminal information storage means are in agreement; and in a case that the identifiers are in agreement, said projection permission determination means stores in said image storage means, image data included in said screen utilization request.

2. A presentation supporting device of claim 1, further comprising:
disconnection instruction means for instructing the disconnection of a link established to a specific terminal;
deletion means for deleting a terminal identifier of a terminal instructed of disconnection and the terminal identifier's order from said terminal information storage means; and
order advancing means for advancing one by one an order of a terminal identifier correlated with said order subsequent to said deleted order.

3. A presentation supporting device of claim 2 further comprising disconnection determination acquiring means for acquiring a set of link disconnection request and a terminal identifier via said communication means; and wherein,
said disconnection instruction means, in a case that said disconnection determination acquiring means acquires a set of disconnection request and a terminal identifier, instructs the disconnection of a link established between a terminal corresponding to the acquired terminal identifier.

4. A presentation supporting device of claim 2 further comprising:
inquiry means that, when an order is advanced by the order advancing means, determines on the basis of storage contents of said terminal information storage means whether a terminal identifier correlated with the first order changes after the advancement; and each time a terminal identifier correlated with the first order changes, sends via said communication means to the address of a terminal corresponding to the terminal identifier a message inquiring whether a presentation is to be performed; and
response acquiring means for acquiring a response for said message via said communication means; and in a case that the acquired response indicates the presentation is not to be performed, advancing an order of a terminal identifier correlated with the order subsequent to the first order.

5. A presentation supporting device of claim 1, further comprising:
deletion means for deleting a pair of occupation time and a terminal identifier correlated with a first order from said terminal information storage means, in a case that the occupation time elapses after the terminal information storage means starts clocking the occupation time correlated with the first order; and
order advancing means for advancing one by one orders correlated with a pair of occupation time and a terminal identifier which is not deleted by said deletion means.

6. A presentation supporting device of claim 5, further comprising output means for outputting a message prompting the disconnection of a link, before the occupation time correlated with said first order elapses.

7. A presentation supporting device, comprising:
communication means for establishing a link between several terminals and for exchanging data between terminals to which said link is established;
image storage means for temporarily storing image data representing an image to be projected on a screen;
terminal information storage means for storing a terminal identifier, used to identify said terminal in relation with an order to allow the occupation of said screen, and for correlating a decision-making flag indicating that an authority is given for determining an occupation order of said screen with any one of said terminal identifier;
projection means for reading image data stored in said image storing means and projecting an image indicated by read image data on said screen;
terminal registration means for acquiring a terminal identifier from a terminal via said communication means each time a link is established between said terminal, and for storing an acquired terminal identifier in said terminal information storage means;
order-setting request acquiring means for acquiring from a terminal that established said link, an order-setting request including a terminal identifier of the terminal and an order to be assigned to each terminal, through said communication means;
order-setting means for determining whether a terminal identifier included in said order-setting request and a terminal identifier correlated with a decision-making flag by said terminal information storage means are in agreement; and in a case that the identifiers are in agreement, correlating orders identified in response to the contents of said order-setting request with each terminal identifier stored in said terminal information storage means;
utilization request acquiring means for acquiring from a terminal that established said link a screen utilization request including a terminal identifier of the terminal and image data via said communication means; and
projection permission determination means for determining whether a terminal identifier included in said acquired screen utilization request and a terminal identifier correlated with the first order by said terminal information storage means are in agreement; and in a case that the identifiers are in agreement, said projection permission determination means stores in said image storage means, image data included in said screen utilization request.

8. A presentation supporting device of claim 7, further comprising:
   disconnection notification acquiring means for acquiring through said communication means a set of link disconnection request and a terminal identifier;
   deletion means, in a case that said disconnection determination acquiring means acquires the set of disconnection request and a terminal identifier, for deleting an acquired terminal identifier and the terminal identifier's order from said terminal information storage means; and
   order advancing means for advancing one by one an order of a terminal identifier correlated with said order subsequent to said deleted order.

9. A presentation supporting device, comprising:
   communication means for establishing a link between several terminals and for exchanging data between terminals to which said link is established;
   image storage means for temporarily storing image data representing an image to be projected on a screen;
   terminal information storage means for storing a terminal identifier, used to identify said terminal in relation with an order to allow the occupation of said screen, and for correlating a decision-making flag indicating that an authority is given for determining an occupation order of said screen with any one of said terminal identifier;
   order storage means for correlating and storing the types of said presentation with orders for allowing the occupation of said screen;
   projection means for reading image data stored in said image storing means and projecting an image indicated by read image data on said screen;
   terminal registration means for acquiring a terminal identifier from a terminal via said communication means each time a link is established between said terminal, and for storing an acquired terminal identifier in said terminal information storage means;
   order input means for inputting an order to be given to each terminal;
   order-setting means for correlating said input order with each terminal identifier stored in said terminal information storage means;
   utilization request acquiring means for acquiring from a terminal that established said link a screen utilization request including a terminal identifier of the terminal and image data via said communication means;
   projection permission determination means for determining whether a terminal identifier included in said acquired screen utilization request and a terminal identifier correlated with the first order by said terminal information storage means are in agreement; and in a case that the identifiers are in agreement, said projection permission determination means stores in said image storage means, image data included in said screen utilization request.

10. A presentation supporting device of claim 9, further comprising:
    disconnection notification acquiring means for acquiring through said communication means a set of link disconnection request and a terminal identifier;
    deletion means, in a ease that said disconnection determination acquiring means acquires the set of disconnection request and a terminal identifier, for deleting an acquired terminal identifier and the terminal identifier's order from said terminal information storage means; and
    order advancing means for advancing one by one an order of a terminal identifier correlated with said order subsequent to said deleted order.

11. A computer program product that is executable by a computer device that includes communication means for establishing a link between several terminals and for exchanging data between terminals to which said link is established, image storage means for temporarily storing image data representing an image to be projected on a screen, terminal information storage means for storing a terminal identifier, used to identify said terminal in relation with an order to allow the occupation of said screen, and input means for inputting orders given for each terminal, the computer program product including instructions for causing the computer device to perform the steps of:
    terminal registration for acquiring a terminal identifier from a terminal via the communication means each time a link is established between a terminal, and for storing an acquired terminal identifier in the terminal information storage means;
    order-setting for correlating an input order with each terminal identifier stored in said terminal information storage means;
    utilization request acquiring for acquiring from a terminal that established said link a screen utilization request including a terminal identifier of the terminal, and image data via said communication means; and
    projection permission determination for determining whether a terminal identifier included in said acquired screen utilization request and a terminal identifier correlated with a first order by said terminal information storage means are in agreement; and in a case that the identifiers are in agreement, said projection permission determination stores in said image storage means, image data included in said screen utilization request.

12. A computer program product according to claim 11, wherein the computer device also includes projection means for reading image data stored in said image storing means and projecting an image indicated by read image data on a screen, and input means for inputting orders to be given to each terminal and a disconnection of link established to a specific terminal, wherein the computer program product also includes instructions for causing the computer device to perform the further steps of:
    deletion for deleting a terminal identifier of a terminal and the terminal identifier's order from said terminal information storage means, when a disconnection of link established to a specific terminal is input through the input means; and
    order advancing for advancing one by one an order of a terminal identifier correlated with said order subsequent to said deleted order.

13. A computer program product according to claim 10, wherein the computer program product is a computer-readable recording medium on which the instructions are recorded.

14. A computer program product that is executable by a computer device that includes communication means for establishing a link between several terminals and for exchanging data between terminals to which said link is established, image storage means for temporarily storing image data representing an image to be projected on a screen, terminal information storage means for storing a terminal identifier, used to identify said terminal in relation with an order to allow the occupation of said screen, and projection means for reading image data stored in said image storing means and projecting an image indicated by read image data on said screen, the computer program product including instructions for causing the computer device to perform the steps of:

terminal registration for acquiring a terminal identifier from a terminal via the communication means each time a link is established between a terminal, and for storing an acquired terminal identifier in the terminal information storage means;

order-setting request acquiring for acquiring from a terminal that established a link, an order-setting request including a terminal identifier of the terminal and an order to be assigned to each terminal, through the communication means;

order-setting for determining whether a terminal identifier included in said order-setting request and a terminal identifier correlated with a decision-making flag by said terminal information storage means are in agreement; and in a case that the identifiers are in agreement, correlating orders identified in response to the contents of said order-setting request with each terminal identifier stored in said terminal information storage means;

utilization request acquiring for acquiring from a terminal that established said link a screen utilization request including a terminal identifier of the terminal and image data via said communication means; and projection permission determination for determining whether a terminal identifier included in said acquired screen utilization request and a terminal identifier correlated with a first order by said terminal information storage means are in agreement; and in a case that the identifiers are in agreement, said projection permission determination stores in said image storage means, image data included in said screen utilization request.

15. A computer program product according to claim 14, wherein the computer program product is a computer-readable recording medium on which the instructions are recorded.

16. A computer program product that is executable by a computer device that includes communication means for establishing a link between several terminals and for exchanging data between terminals to which said link is established, image storage means for temporarily storing image data representing an image to be projected on a screen, terminal information storage means for storing a terminal identifier, used to identify said terminal in relation with an order to allow the occupation of said screen, and projection means for reading image data stored in said image storing means and projecting an image indicated by read image data on said screen, the computer program product including instructions for causing the computer device to perform the steps of:

terminal registration for acquiring a terminal identifier from a terminal via the communication means each time a link is established between a terminal, and for storing an acquired terminal identifier in the terminal information storage means;

order input for inputting an order to be given to each terminal;

order-setting for correlating said input order with each terminal identifier stored in said terminal information storage means;

utilization request acquiring for acquiring from said terminal that established a link a screen utilization request including a terminal identifier of the terminal and image data via the communication; and projection permission determination for determining whether a terminal identifier included in said acquired screen utilization request and a terminal identifier correlated with the first order by said terminal information storage means are in agreement; and in a case that the identifiers are in agreement, said projection permission determination stores in said image storage means, image data included in said screen utilization request.

17. A computer program product according to claim 16, further comprising instructions for causing the computer device to perform the further steps of:

deletion for deleting a pair of occupation time and a terminal identifier correlated with a first order from said terminal information storage means, in a case that the occupation time elapses after the terminal information storage means starts clocking the occupation time correlated with the first order; and order advancing for advancing one by one orders correlated with a pair of occupation time and a terminal identifier which is not deleted.

18. A computer program product according to claim 16, wherein the computer program product is a computer-readable recording medium on which the instructions are recorded.

* * * * *